United States Patent
Nakao et al.

(10) Patent No.: US 10,028,268 B2
(45) Date of Patent: **\*Jul. 17, 2018**

(54) BASE STATION DEVICE, TERMINAL DEVICE AND COMMUNICATION METHOD

(71) Applicant: Godo Kaisha IP Bridge 1, Tokyo (JP)

(72) Inventors: Seigo Nakao, Singapore (SG); Daichi Imamura, Beijing (CN)

(73) Assignee: Godo Kaisha IP Bridge 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,566

(22) Filed: Aug. 2, 2017

(65) Prior Publication Data

US 2017/0359809 A1      Dec. 14, 2017

Related U.S. Application Data

(63) Continuation of application No. 15/439,159, filed on Feb. 22, 2017, now Pat. No. 9,756,634, which is a
(Continued)

(30) Foreign Application Priority Data

Jun. 19, 2009   (JP) ................................ 2009-146592
Nov. 2, 2009    (JP) ................................ 2009-252051

(51) Int. Cl.
   *H04W 72/04*        (2009.01)
   *H04W 76/04*        (2009.01)
   (Continued)

(52) U.S. Cl.
   CPC ......... *H04W 72/042* (2013.01); *H04L 1/1864* (2013.01); *H04L 5/001* (2013.01);
   (Continued)

(58) Field of Classification Search
   CPC ... H04L 1/1621; H04L 1/1861; H04L 5/0053; H04L 1/18; H04L 5/001; H04L 1/1864;
   (Continued)

(56) References Cited

U.S. PATENT DOCUMENTS 8,331,947 B2   12/2012   Kim et al.
8,351,385 B2    1/2013   Imamura et al.
(Continued)

FOREIGN PATENT DOCUMENTS

| CN | 101267253 A | 9/2008 |
| CN | 101296513 A | 10/2008 |
| WO | 2009/022849 A1 | 2/2009 |
| WO | 2009/037853 A1 | 3/2009 |

OTHER PUBLICATIONS

3GPP TS 36.211 V8.6.0, "Physical Channels and Modulation," $3^{rd}$ Generation Partnership Project, Technical Specification Group Radio Access Network, Evolved Universal Terrestrial Radio Access (E-UTRA), Release 8, Mar. 2009, pp. 1-83.
(Continued)

*Primary Examiner* — Gbemileke J Onamuti
(74) *Attorney, Agent, or Firm* — Seed IP Law Group LLP

(57) ABSTRACT

In a terminal, a control unit transmits a bundle response signal using a resource in a basic region of an uplink control channel in an uplink unit band of a unit band group when no error is detected in each of a plurality of pieces of downlink data of the unit band group, the uplink control channel in the uplink unit band being associated with a downlink control channel in a basic unit band that is a downlink unit band in which a broadcast channel signal including information relating to the uplink unit band is transmitted, and the control unit transmits the bundle response signal using a resource in an additional region of the uplink control channel when an error is detected in each of the plurality of pieces of downlink data.

19 Claims, 13 Drawing Sheets

Related U.S. Application Data continuation of application No. 15/186,129, filed on Jun. 17, 2016, now Pat. No. 9,641,302, which is a continuation of application No. 14/818,612, filed on Aug. 5, 2015, now Pat. No. 9,397,809, which is a continuation of application No. 13/377,348, filed as application No. PCT/JP2010/004099 on Jun. 18, 2010, now Pat. No. 9,136,985.

(51) Int. Cl.
| | | |
|---|---|---|
| *H04L 1/18* | (2006.01) | |
| *H04L 5/00* | (2006.01) | |
| *H04W 84/04* | (2009.01) | |
| *H04W 76/28* | (2018.01) | |

(52) U.S. Cl.
CPC ..... *H04W 72/0413* (2013.01); *H04W 76/048* (2013.01); *H04W 76/28* (2018.02); *H04W 84/042* (2013.01)

(58) Field of Classification Search
CPC ........... H04W 72/0453; H04W 72/042; H04W 74/004; H04W 76/048; H04W 72/0413
See application file for complete search history.

(56) References Cited

U.S. PATENT DOCUMENTS

| | | |
|---|---|---|
| 8,594,017 B2 | 11/2013 | Xia et al. |
| 9,136,985 B2 | 9/2015 | Nakao et al. |
| 2010/0232378 A1 | 9/2010 | Imamura et al. |
| 2011/0032926 A1 | 2/2011 | Xia et al. |
| 2011/0222491 A1 | 9/2011 | Vajapeyam et al. |
| 2012/0044871 A1 | 2/2012 | Li et al. |

OTHER PUBLICATIONS

3GPP TS 36.212 V8.6.0, "Multiplexing and channel coding," $3^{rd}$ Generation Partnership Project, Technical Specification Group Radio Access Network, Evolved Universal Terrestrial Radio Access (E-UTRA), Release 8, Mar. 2009, pp. 1-59.

3GPP TS 36.213 V8.6.0, "Physical layer procedures," $3^{rd}$ Generation Partnership Project, Technical Specification Group Radio Access Network, Evolved Universal Terrestrial Radio Access (E-UTRA), Release 8, Mar. 2009, pp. 1-77.

Catt, "UL ACK/NACK transmission scheme for LTE-A," R1-091997, Agenda Item: 15.4, 3GPP TSG RAN WG1 meeting #57, San Francisco, USA, May 4-8, 2009, 3 pages.

Chinese Search Report, dated Mar. 17, 2017, for corresponding CN Application No. 2014105206532, 2 pages.

Chinese Search Report, dated Nov. 21, 2013, for corresponding Chinese Patent Application No. 201080027057.0, 2 pages (English Translation).

Ericsson, "Details of ACK/NAK bundling for TDD," R1-081566, TSG-RAN WG1 #52bis, Shenzhen, China, Mar. 31-Apr. 4, 2008, 4 pages.

Extended European Search Report, dated May 26, 2017, for European Application No. 10789258.0-1875, 10 pages.

Huawei, "PUCCH design for carrier aggregation," R1-093838, 3GPP TSG RAN WG1 Meeting #58bis, Miyazaki, Japan, Oct. 12-16, 2009, 6 pages.

International Search Report, dated Sep. 21, 2010, for International Application No. PCT/JP2010/004099, dated Sep. 21, 2010, 1 page.

Nakao et al., "Performance enhancement of E-UTRA uplink control channel in fast fading environments," IEEE $69^{th}$ Vehicular Technology Conference, Barcelona, Spain, Apr. 26-29, 2009, 5 pages.

Panasonic, "PUCCH resource indication for carrier aggregation and SORTD," R1-101252, 3GPP TSG RAN WG1 Meeting #60, San Francisco, California, USA, Feb. 22-26, 2010, 9 pages.

Panasonic, "UL ACK/NACK transmission on PUCCH for carrier aggregation," R1-091744, 3GPP TSG-RAN WG1 Meeting #57, San Francisco, California, USA, May 4-8, 2009, 3 pages.

Panasonic, NTT DoCoMo, "Necessity of the scrambling for ACK/NACK on PUCCH," R1-082403, 3GPP TSG RAN WG1 Meeting #54, Warsaw, Poland, Jun. 30-Jul. 4, 2008, 7 pages.

Texas Instruments, LGE, Samsung, ZTE, "Way forward on support of ACK/NAK repetition," R1-083123, 3GPP TSG RAN WG1 Meeting #54, Jeju, South Korea, Aug. 18-22, 2008, 4 pages.

ZTE, "Uplink Control Channel Design for LTE-Advanced," R1-091702, TSG-RAN WG1 Meeting #57, San Francisco, California, USA, May 4-8, 2009, 6 pages.

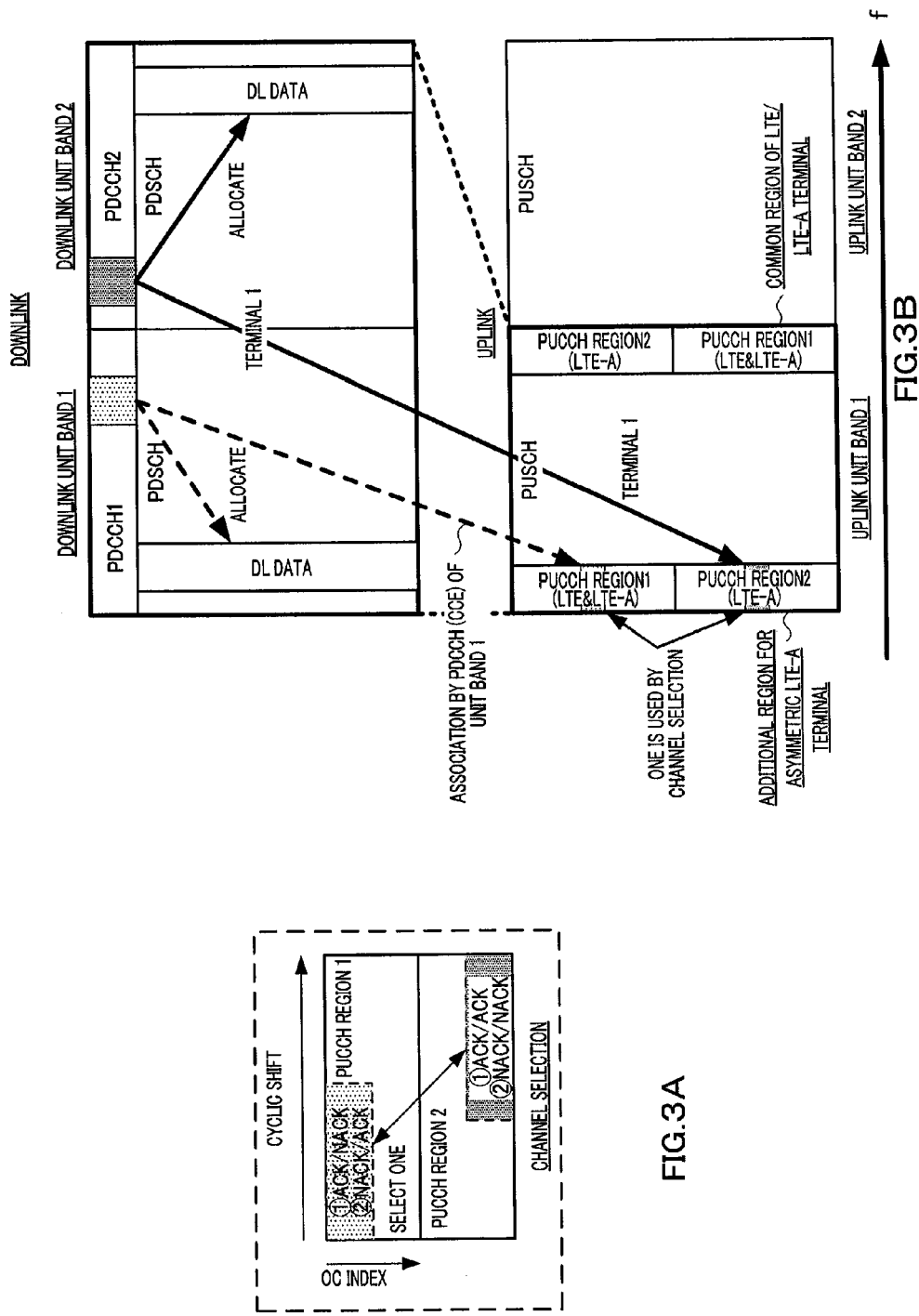

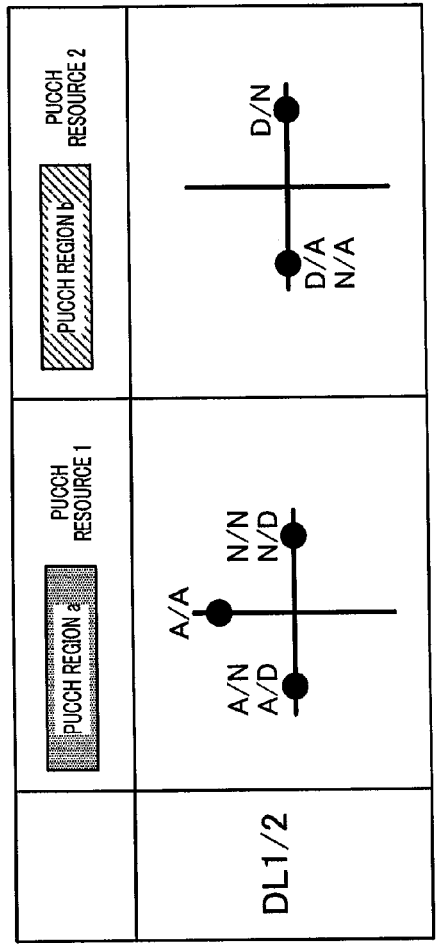
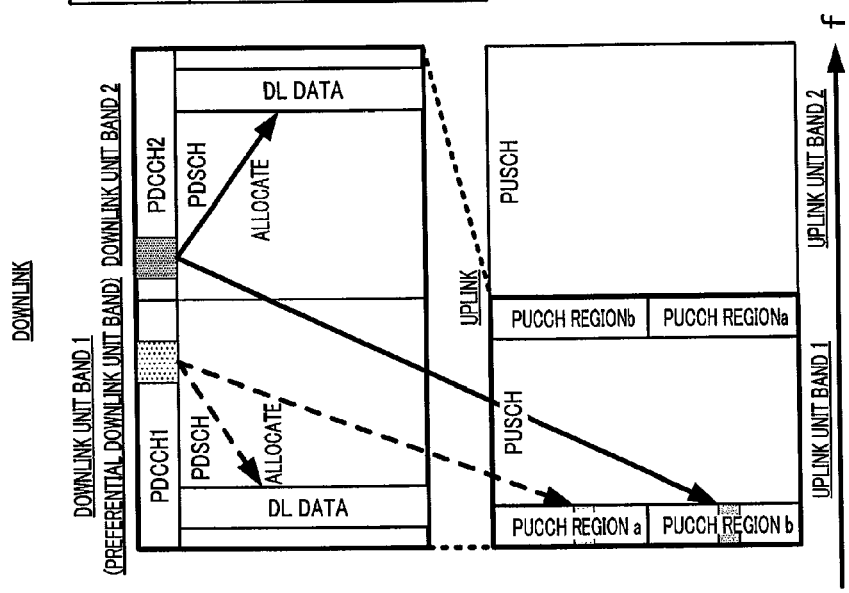
FIG.12B
FIG.12A

BASE STATION DEVICE, TERMINAL DEVICE AND COMMUNICATION METHOD

TECHNICAL FIELD

The present invention relates to a terminal apparatus and retransmission control method.

BACKGROUND ART

3GPP LTE adopts OFDMA (Orthogonal Frequency Division Multiple Access) as a downlink communication scheme.

In a radio communication system to which 3GPP LTE is applied, a base station transmits a synchronization signal (Synchronization Channel: SCH) and broadcast signal (Broadcast Channel: BCH) using predetermined communication resources. A terminal secures synchronization with the base station by catching an SCH first. After that, the terminal acquires parameters specific to the base station (e.g., frequency bandwidth) by reading BCH information (see Non-Patent Literatures 1, 2 and 3).

Furthermore, after completing the acquisition of parameters specific to the base station, the terminal makes a connection request to the base station to thereby establish communication with the base station. The base station transmits control information to the terminal with which communication is established via a PDCCH (Physical Downlink Control CHannel) as required.

The terminal then makes a "blind decision" on each of a plurality of pieces of control information included in the received PDCCH signal. That is, the control information includes a CRC (Cyclic Redundancy Check) portion and this CRC portion is masked with a terminal ID of the transmission target terminal in the base station. Therefore, the terminal cannot decide whether or not the control information is directed to the terminal until the CRC portion of the received control information is demasked with the terminal ID of the terminal. When the demasking result shows that the CRC calculation is OK in the blind decision, the control information is decided to be directed to the terminal.

Furthermore, in 3GPP LTE, ARQ (Automatic Repeat Request) is applied to downlink data from a base station to a terminal. That is, the terminal feeds back a response signal indicating the error detection result of the downlink data to the base station. The terminal performs a CRC on the downlink data and feeds back ACK (Acknowledgment) when CRC=OK (no error) and NACK (Negative Acknowledgment) when CRC=NG (error present) as a response signal to the base station. An uplink control channel such as PUCCH (Physical Uplink Control Channel) is used for feedback of this response signal (that is, ACK/NACK signal).

Here, the control information transmitted from the base station includes resource allocation information including resource information or the like allocated by the base station to the terminal. The aforementioned PDCCH is used for transmission of this control information. This PDCCH is made up of one or a plurality of L1/L2 CCHs (L1/L2 Control Channels). Each L1/L2 CCH is made up of one or a plurality of CCEs (Control Channel Elements). That is, a CCE is a base unit when control information is mapped to a PDCCH. Furthermore, when one L1/L2 CCH is made up of a plurality of CCEs, a plurality of continuous CCEs are allocated to the L1/L2 CCH. The base station allocates an L1/L2 CCH to the resource allocation target terminal according to the number of CCEs necessary to report control information for the resource allocation target terminal.

The base station then transmits control information mapped to physical resources corresponding to the CCEs of the L1/L2 CCH.

Here, each CCE has a one-to-one correspondence with a component resource of the PUCCH. Therefore, the terminal that has received the L1/L2 CCH identifies component resources of the PUCCH corresponding to CCEs making up the L1/L2 CCH and transmits a response signal to the base station using the resources. However, when a plurality of CCEs where there are continuous L1/L2 CCHs are occupied, the terminal transmits a response signal to the base station using one of the plurality of PUCCH component resources (e.g., PUCCH component resources corresponding to a CCE having the smallest index) corresponding to the plurality of respective CCEs. This allows downlink communication resources to be used efficiently.

As shown in FIG. 1, a plurality of response signals transmitted from a plurality of terminals are spread by a ZAC (Zero Auto-correlation) sequence having a Zero Auto-correlation characteristic, Walsh sequence and DFT (Discrete Fourier Transform) sequence on the time axis and code-multiplexed within the PUCCH. In FIG. 1, ($W_0$, $W_1$, $W_2$, $W_3$) represents a Walsh sequence having a sequence length of 4 and ($F_0$, $F_1$, $F_2$) represents a DFT sequence having a sequence length of 3. As shown in FIG. 1, in the terminal, a response signal such as ACK or NACK is primary-spread by a ZAC sequence (sequence length 12) into a frequency component corresponding to 1 SC-FDMA symbol on the frequency axis first. Next, the primary-spread response signal and the ZAC sequence as a reference signal are secondary-spread in association with a Walsh sequence (sequence length 4: $W_0$ to $W_3$) and DFT sequence (sequence length 3: $F_0$ to $F_3$) respectively. Furthermore, the secondary-spread signal is further transformed into a signal having a sequence length of 12 on the time axis through IFFT (Inverse Fast Fourier Transform).

A CP is added to each signal after the IFFT and a one-slot signal made up of seven SC-FDMA symbols is thereby formed.

Response signals transmitted from different terminals are spread using a ZAC sequence corresponding to different cyclic shift indices or orthogonal code sequences corresponding to different sequence numbers (Orthogonal cover Index: OC index). The orthogonal code sequence is a combination of a Walsh sequence and a DFT sequence. Furthermore, the orthogonal code sequence may be referred to as a "block-wise spreading code." Therefore, the base station can demultiplex a plurality of code-multiplexed response signals using conventional despreading and correlation processing (see Non-Patent Literature 4).

However, since each terminal makes a blind decision on a downlink allocation control signal directed to the terminal in each subframe, the terminal side does not necessarily succeed in receiving the downlink allocation control signal. When the terminal fails to receive the downlink allocation control signal directed to the terminal in a certain downlink unit band, the terminal cannot even know whether or not there is downlink data directed to the terminal in the downlink unit band. Therefore, when failing to receive the downlink allocation control signal in a certain downlink unit band, the terminal cannot even generate a response signal for the downlink data in the downlink unit band. This error case is defined as a DTX of response signal (DTX (Discontinuous transmission) of ACK/NACK signals) in the sense that transmission of the response signal is not performed on the terminal side.

Furthermore, standardization of 3GPP LTE-advanced which realizes faster communication than 3GPP LTE has started. A 3GPP LTE-advanced system (hereinafter, may also be referred to as "LTE-A system") follows the 3GPP LTE system (hereinafter also referred to as "LTE system"). In order to realize a downlink transmission rate of a maximum of 1 Gbps or above, 3GPP LTE-advanced is expected to introduce base stations and terminals capable of communicating at a wideband frequency of 40 MHz or above.

In an LTE-A system, to realize communication at an ultra-high transmission rate several times as fast as the transmission rate in an LTE system and backward compatibility with the LTE system simultaneously, a band for the LTE-A system is divided into "unit bands" of 20 MHz or less, which is a support bandwidth for the LTE system. That is, the "unit band" is a band having a width of maximum 20 MHz and defined as a base unit of a communication band. Furthermore, a "unit band" in a downlink (hereinafter referred to as "downlink unit band") may be defined as a band divided by downlink frequency band information in a BCH broadcast from the base station or by a spreading width when the downlink control channel (PDCCH) is spread and arranged in the frequency domain. On the other hand, a "unit band" in an uplink (hereinafter referred to as "uplink unit band") may be defined as a band divided by uplink frequency band information in a BCH broadcast from the base station or as a base unit of a communication band of 20 MHz or less including a PUSCH (Physical Uplink Shared CHannel) region near the center and PUCCHs for LTE at both ends. Furthermore, in 3GPP LTE-Advanced, the "unit band" may also be expressed as "component carrier(s)" in English.

The LTE-A system supports communication using a band that bundles several unit bands, so-called "carrier aggregation." Since throughput requirements for an uplink are generally different from throughput requirements for a downlink, in the LTE-A system, studies are being carried out on carrier aggregation using different numbers of unit bands set for an arbitrary LTE-A system compatible terminal (hereinafter referred to as "LTE-A terminal") between the uplink and downlink, so-called "asymmetric carrier aggregation." Cases are also supported where the number of unit bands is asymmetric between the uplink and downlink and the frequency bandwidth differs from one unit band to another.

FIG. 2A and FIG. 2B are diagrams illustrating asymmetric carrier aggregation and its control sequence applied to individual terminals. FIG. 2B shows an example where the bandwidth and the number of unit bands are symmetric between the uplink and downlink of a base station.

In FIG. 2B, a setting (configuration) is made for terminal 1 such that carrier aggregation is performed using two downlink unit bands and one uplink unit band on the left side, whereas a setting is made for terminal 2 such that although the two same downlink unit bands as those in terminal 1 are used, the uplink unit band on the right side is used for uplink communication.

Focusing attention on terminal 1, signals are transmitted/received between an LTE-A base station and LTE-A terminal making up an LTE-A system according to the sequence diagram shown in FIG. 2A. As shown in FIG. 2A, (1) terminal 1 establishes synchronization with the downlink unit band on the left side at a start of communication with the base station and reads information of the uplink unit band which forms a pair with the downlink unit band on the left side from a broadcast signal called "SIB2 (System Information Block Type 2)." (2) Using this uplink unit band, terminal 1 starts communication with the base station by transmitting, for example, a connection request to the base station. (3) Upon deciding that a plurality of downlink unit bands need to be allocated to the terminal, the base station instructs the terminal to add a downlink unit band. In this case, however, the number of uplink unit bands does not increase and terminal 1 which is an individual terminal starts asymmetric carrier aggregation.

Furthermore, in LTE-A to which the aforementioned carrier aggregation is applied, the terminal may receive a plurality of pieces of downlink data in a plurality of downlink unit bands at a time. In LTE-A, studies are being carried out on channel selection (also referred to as "multiplexing") as one of transmission methods for a plurality of response signals for the plurality of pieces of downlink data. In channel selection, not only symbols used for a response signal but also resources to which the response signal is mapped are changed according to a pattern of error detection results regarding the plurality of pieces of downlink data. That is, channel selection is a technique that changes not only phase points (that is, constellation points) of a response signal but also resources used to transmit the response signal based on whether each of response signals for a plurality of pieces of downlink data received in a plurality of downlink unit bands as shown in FIG. 3B is ACK or NACK (see Non-Patent Literatures 5 and 6).

Here, ARQ control by channel selection when the above-described asymmetric carrier aggregation is applied to a terminal will be described using FIG. 3B.

When, for example, a unit band group made up of downlink unit bands 1 and 2, and uplink unit band 1 (which may be expressed as "component carrier set" in English) is set for terminal 1 as shown in FIG. 3B, downlink resource allocation information is transmitted from the base station to terminal 1 via respective PDCCHs of downlink unit bands 1 and 2 and then downlink data is transmitted using resources corresponding to the downlink resource allocation information.

When the terminal succeeds in receiving downlink data in unit band 1 and fails to receive downlink data in unit band 2 (that is, when the response signal of unit band 1 is ACK and the response signal of unit band 2 is NACK), the response signal is mapped to PUCCH resources included in PUCCH region 1 and a first constellation point (e.g., constellation point (1,0)) is used as a constellation point of the response signal. On the other hand, when the terminal succeeds in receiving downlink data in unit band 1 and also succeeds in receiving downlink data in unit band 2, the response signal is mapped to PUCCH resources included in PUCCH region 2 and the first constellation point is used. That is, when there are two downlink unit bands, since there are four error detection result patterns, the four patterns can be represented by combinations of two resources and two types of constellation point.

CITATION LIST

Non-Patent Literature

NPL 1
3GPP TS 36.211 V8.6.0, "Physical Channels and Modulation (Release 8)," March 2009
NPL 2
3GPP TS 36.212 V8.6.0, "Multiplexing and channel coding (Release 8)," March 2009

NPL 3
3GPP TS 36.213 V8.6.0, "Physical layer procedures (Release 8)," March 2009
NPL 4
Seigo Nakao et al. "Performance enhancement of E-UTRA uplink control channel in fast fading environments", Proceeding of VTC2009 spring, April, 2009
NPL 5
ZTE, 3GPP RAN1 meeting #57, R1-091702, "Uplink Control Channel Design for LTE-Advanced," May 2009
NPL 6
Panasonic, 3GPP RAN1 meeting #57, R1-091744, "UL ACK/NACK transmission on PUCCH for carrier aggregation," May 2009

SUMMARY OF INVENTION

Technical Problem

However, since an arbitrary terminal transmits a response signal using one of a plurality of PUCCH resources in the aforementioned channel selection, the base station side must secure a plurality of PUCCH resources for the arbitrary terminal.

In an LTE system, since, for example, downlink unit band 1 in FIG. 3B is associated with uplink unit band 1 to form a band pair and downlink unit band 2 is associated with uplink unit band 2 to form a band pair, PUCCH corresponding to downlink unit band 2 needs to be provided for only uplink unit band 2. On the other hand, in LTE-A, when asymmetric carrier aggregation is individually set (configured) for terminals, as shown in FIG. 3B, uplink unit band 1 also needs to secure PUCCH resources for a response signal for downlink unit band 2 caused by the association of unit bands specific to the LTE-A terminal such as downlink unit band 2 and uplink unit band 1. That is, the uplink control channel (PUCCH) of uplink unit band 1 needs to be provided with an additional region (PUCCH region 2) in addition to the basic region (PUCCH region 1).

This means that when channel selection is applied as a response signal transmission method in the LTE-A system, the PUCCH overhead drastically increases compared to the LTE system. This additional overhead for the LTE system increases as the asymmetry between downlink unit bands and uplink unit bands of a terminal increases.

Furthermore, to minimize the aforementioned additional overhead, more PUCCH resources may be secured in PUCCH region 2 than PUCCH region 1 (that is, the number of codes multiplexed in the same time/frequency resource is increased). However, in this case, transmission characteristics of a response signal deteriorate due to influences of inter-code interference caused by the increase in the number of codes multiplexed.

It is an object of the present invention to provide a terminal apparatus and retransmission control method for when applying ARQ to communication using an uplink unit band and a plurality of downlink unit bands associated with the uplink unit band, capable of preventing deterioration of transmission characteristics of a response signal and suppressing increases in overhead of an uplink control channel to a minimum.

Solution to Problem

A terminal apparatus according to the present invention is a terminal apparatus that communicates with a base station using a unit band group made up of a plurality of downlink unit bands and an uplink unit band and transmits one bundled response signal through an uplink control channel of the uplink unit band based on an error detection result of a plurality of pieces of downlink data arranged in the plurality of downlink unit bands, including a downlink data receiving section that receives downlink data transmitted through at least one downlink data channel of the plurality of downlink unit bands, an error detection section that detects the presence or absence of a reception error of the received downlink data and a response control section that transmits the bundled response signal using one of a first region and a second region of the uplink control channel based on a reception situation pattern determined by the error detection result obtained in the error detection section, wherein the response control section transmits the bundled response signal using resources of the first region in the case of a reception situation pattern having a high probability of occurrence and transmits the bundled response signal using resources of the second region in the case of a reception situation pattern having a low probability of occurrence.

A retransmission control method according to the present invention includes a downlink data receiving step of receiving downlink data transmitted through at least one downlink data channel of a plurality of downlink unit bands included in a unit band group, an error detection step of detecting a reception error of the received downlink data and a response controlling step of transmitting a bundled response signal using one of a first region and a second region of an uplink control channel in an uplink unit band included in the unit band group based on a reception situation pattern determined by the error detection result obtained in the error detection step, wherein in the response control step, the bundled response signal is transmitted using resources of the first region in the case of a reception situation pattern having a high probability of occurrence and the bundled response signal is transmitted using resources of the second region in the case of a reception situation pattern having a low probability of occurrence.

Advantageous Effects of Invention

The present invention can provide a terminal apparatus and retransmission control method for when applying ARQ to communication using an uplink unit band and a plurality of downlink unit bands associated with the uplink unit band, capable of preventing deterioration of transmission characteristics of a response signal and suppressing increases in overhead of an uplink control channel to a minimum.

BRIEF DESCRIPTION OF DRAWINGS

FIG. 3A and FIG. 3B are diagrams illustrating ARQ control when carrier aggregation is applied to a terminal;

FIG. 12A and FIG. 12B are diagrams illustrating operations of the base station and terminal.

DESCRIPTION OF EMBODIMENTS

Figure 1:
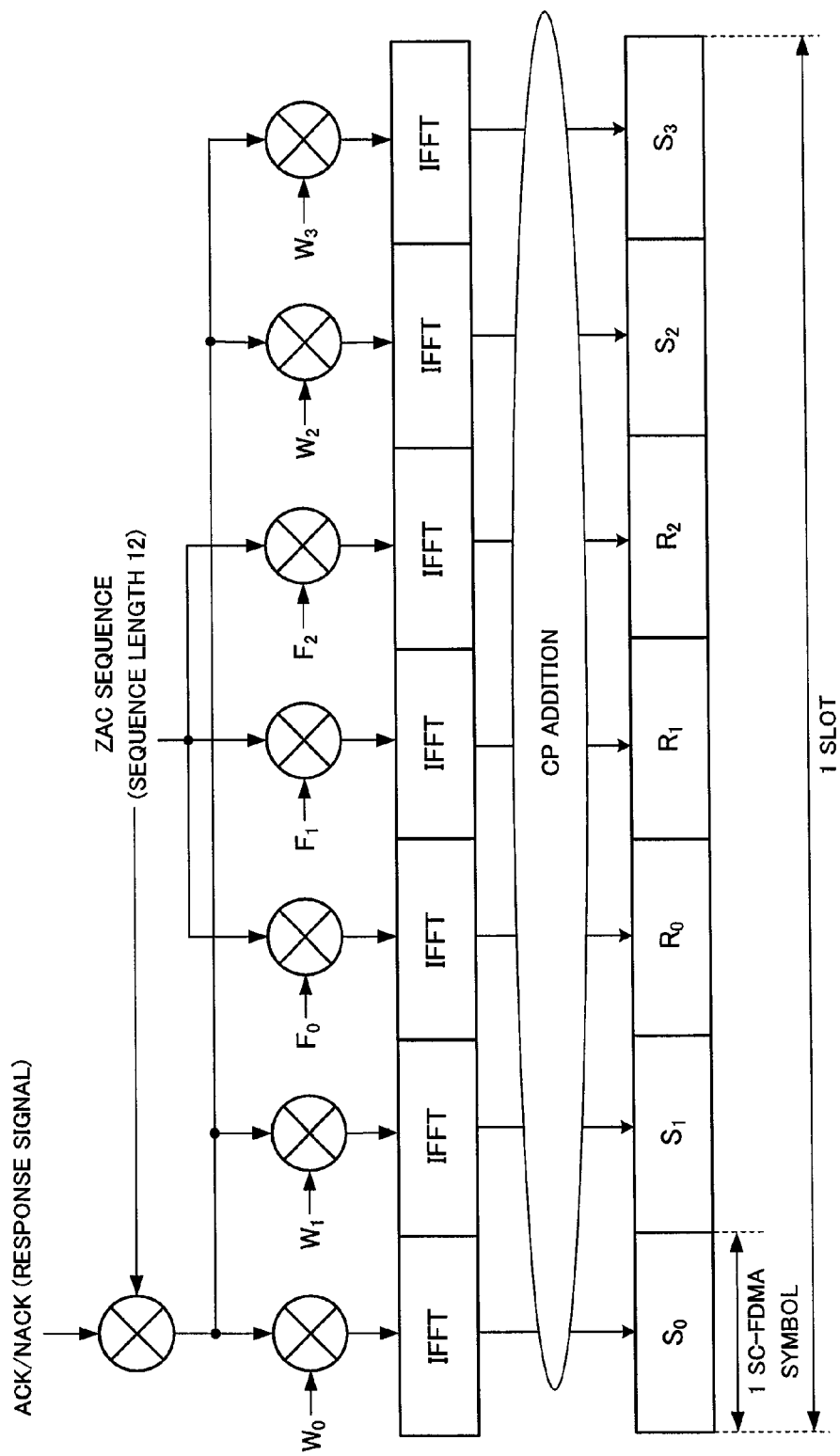
FIG. 1 is a diagram illustrating a method of spreading a response signal and reference signal.

Hereinafter, embodiments of the present invention will be described in detail with reference to the accompanying drawings. The same components among different embodiments will be assigned the same reference numerals and overlapping descriptions thereof will be omitted.

Embodiment 1

[Overview of Communication System]

A communication system including base station 100 and terminal 200, which will be described later, performs communication using an uplink unit band and a plurality of downlink unit bands associated with the uplink unit band, that is, communication using asymmetric carrier aggregation specific to terminal 200. Furthermore, this communication system also includes terminals that have no capability of performing communication using carrier aggregation unlike terminal 200 and perform communication using one downlink unit band and one uplink unit band associated therewith (that is, communication without using carrier aggregation).

Therefore, base station 100 is configured to be able to support both communication using asymmetric carrier aggregation and communication without using carrier aggregation.

Furthermore, communication without using carrier aggregation can also be performed between base station 100 and terminal 200 depending on resource allocation to terminal 200 by base station 100.

Furthermore, this communication system performs conventional ARQ when performing communication without using carrier aggregation on one hand, and adopts channel selection in ARQ when performing communication using carrier aggregation on the other. That is, this communication system is, for example, an LTE-A system, base station 100 is, for example, an LTE-A base station and terminal 200 is, for example, an LTE-A terminal. Furthermore, the terminal having no capability of performing communication using carrier aggregation is, for example, an LTE terminal.

Descriptions will be given below assuming the following matters as premises. That is, asymmetric carrier aggregation specific to terminal 200 is configured beforehand between base station 100 and terminal 200 and information of downlink unit bands and uplink unit bands to be used by terminal 200 is shared between base station 100 and terminal 200. Furthermore, the downlink unit band set (configured) for arbitrary terminal 200 by base station 100 for transmitting BCH for broadcasting information on an uplink unit band making up a unit band group reported (signaled) to terminal 200 beforehand is a "base unit band" for terminal 200. The information on this base unit band is "base unit band information." Therefore, arbitrary terminal 200 can recognize the base unit band information by reading BCH information in each downlink unit band.

[Configuration of Base Station]

Figure 4:
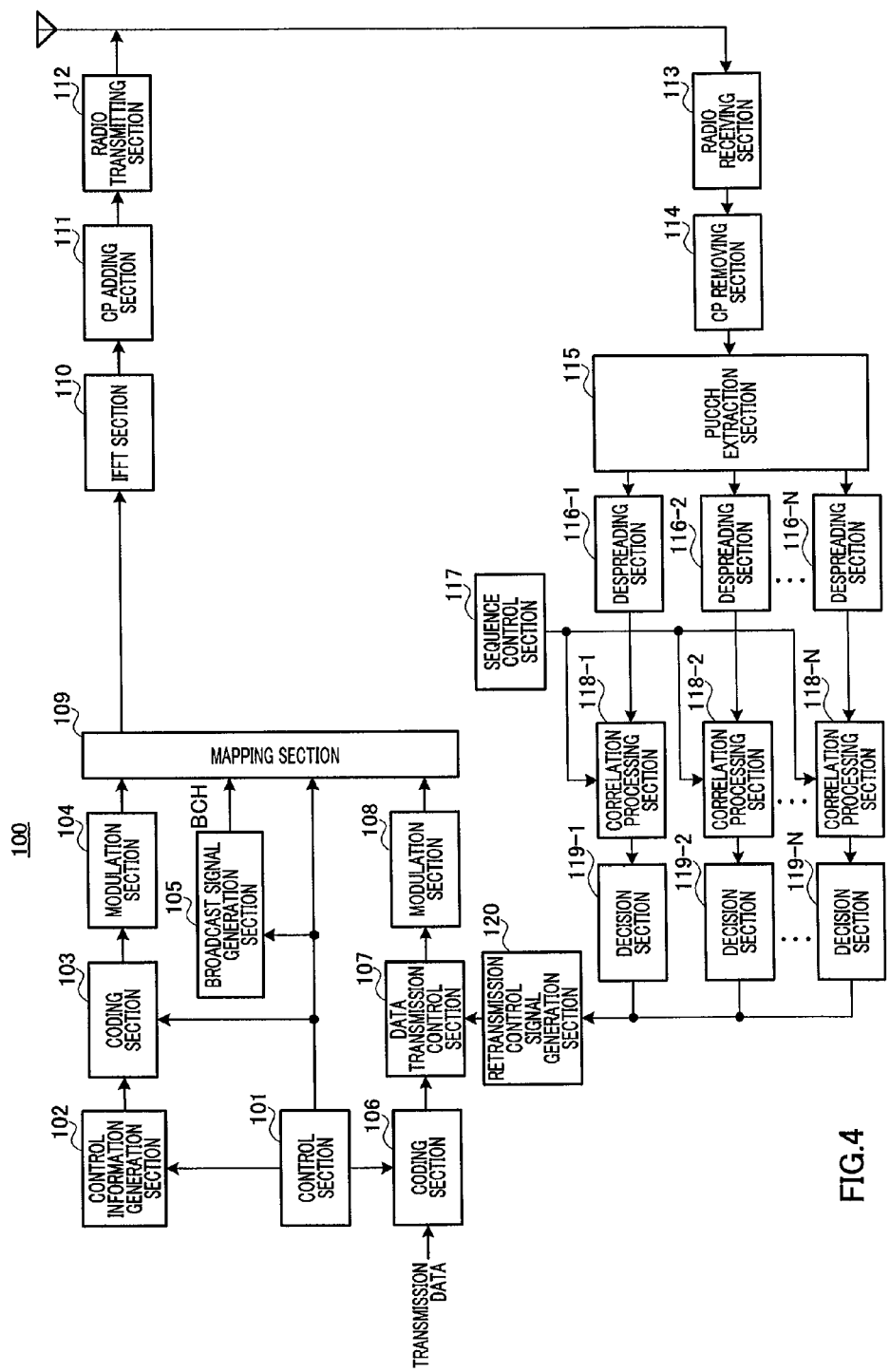
FIG. 4 is a block diagram showing a configuration of a base station according to Embodiment 1 of the present invention.

FIG. 4 is a block diagram showing a configuration of base station 100 according to Embodiment 1 of the present invention. In FIG. 4, base station 100 includes control section 101, control information generation section 102, coding section 103, modulation section 104, broadcast signal generation section 105, coding section 106, data transmission control section 107, modulation section 108, mapping section 109, IFFT section 110, CP adding section 111, radio transmitting section 112, radio receiving section 113, CP removing section 114, PUCCH extraction section 115, despreading section 116, sequence control section 117, correlation processing section 118, decision section 119 and retransmission control signal generation section 120.

Control section 101 allocates (assigns), to resource allocation target terminal 200, downlink resources to transmit control information (that is, downlink control information allocation resources), downlink resources to transmit downlink data included in the control information (that is, downlink data allocation resources). Such resources are allocated in downlink unit bands included in a unit band group set in resource allocation target terminal 200. Furthermore, the downlink control information allocation resources are selected from among resources corresponding to a downlink control channel (PDCCH) in each downlink unit band. Furthermore, the downlink data allocation resources are selected from among resources corresponding to a downlink data channel (PDSCH) in each downlink unit band. Furthermore, when there are a plurality of resource allocation target terminals 200, control section 101 allocates different resources to respective resource allocation target terminals 200.

The downlink control information allocation resources are equivalent to above-described L1/L2 CCHs. That is, each of the downlink control information allocation resources is made up of one or a plurality of CCEs. Furthermore, each CCE in the base unit band is associated with a component resource in an uplink control channel region (PUCCH region) in an uplink unit band in the unit band group in a one-to-one correspondence.

Furthermore, control section 101 determines a coding rate used to transmit control information to resource allocation target terminal 200. Since the amount of data of the control information differs according to this coding rate, control section 101 allocates downlink control information allocation resources having a number of CCEs to which control information corresponding to this amount of data is mapped.

Furthermore, control section 101 generates a DAI (Downlink Assignment Indicator) which is information indicating which downlink unit band is used to allocate downlink resources to resource allocation target terminal 200.

Control section 101 then outputs information on the downlink data allocation resources and a DAI to control information generation section 102. Furthermore, control section 101 outputs information on a coding rate to coding section 103. Furthermore, control section 101 determines a coding rate of transmission data (that is, downlink data) and outputs the coding rate to coding section 106. Furthermore, control section 101 outputs information on the downlink data allocation resources and downlink control information allocation resources to mapping section 109. However, control section 101 performs control so as to map downlink data and downlink control information for the downlink data to the same downlink unit band.

Furthermore, control section 101 outputs information on the maximum number of code-multiplexed PUCCH signals per unit time/frequency resource (1 resources block: 1 RB) (that is, multiplexing level information) arranged in each PUCCH region to broadcast signal generation section 105. Furthermore, control section 101 outputs a control signal to generate a broadcast channel signal (BCH) to be transmitted to broadcast signal generation section 105. Control over the number of PUCCH resources per unit time/frequency resource in each PUCCH region will be described in detail later.

Control information generation section 102 generates information on downlink data allocation resources and control information including a DAI and outputs the information to coding section 103. The control information is generated for each downlink unit band. Furthermore, when there are a plurality of resource allocation target terminals 200, the control information includes a terminal ID of a destination terminal to distinguish between resource allocation target terminals 200. For example, the control information includes a CRC bit masked with a terminal ID of the destination terminal. This control information may be called "downlink allocation control information." Furthermore, the DAI is included in all control information directed to resource allocation target terminals 200.

Coding section 103 codes control information according to the coding rate received from control section 101 and outputs the coded control information to modulation section 104.

Modulation section 104 modulates the coded control information and outputs the modulated signal obtained to mapping section 109.

Broadcast signal generation section 105 generates a broadcast signal (BCH) for each downlink unit band according to the information and control signal received from control section 101 and outputs the broadcast signal to mapping section 109.

Coding section 106 receives transmission data per destination terminal 200 (that is, downlink data) and coding rate information from control section 101 as input, codes transmission data and outputs the coded transmission data to data transmission control section 107. However, when a plurality of downlink unit bands are allocated to destination terminal 200, transmission data transmitted in each downlink unit band is coded and the coded transmission data is outputted to data transmission control section 107.

Upon initial transmission, data transmission control section 107 stores the coded transmission data and also outputs the coded transmission data to modulation section 108. The coded transmission data is stored for each destination terminal 200. Furthermore, transmission data for one destination terminal 200 is stored for each downlink unit band transmitted. This enables not only retransmission control over the entire data transmitted to destination terminal 200 but also retransmission control over each downlink unit band.

Furthermore, upon receiving NACK or DTX for downlink data transmitted in a certain downlink unit band from retransmission control signal generation section 120, data transmission control section 107 outputs the stored data corresponding to this downlink unit band to modulation section 108. Upon receiving ACK for downlink data transmitted in a certain downlink unit band from retransmission control signal generation section 120, data transmission control section 107 deletes the stored data corresponding to this downlink unit band.

Modulation section 108 modulates the coded transmission data received from data transmission control section 107 and outputs the modulated signal to mapping section 109.

Mapping section 109 maps the modulated signal of the control information received from modulation section 104 to resources indicated by the downlink control information allocation resources received from control section 101 and outputs the mapping result to IFFT section 110.

Furthermore, mapping section 109 maps the modulated signal of the transmission data received from modulation section 108 to resources indicated by the downlink data allocation resources received from control section 101 and outputs the mapping result to IFFT section 110.

Mapping section 109 maps broadcast information to predetermined time/frequency resources and outputs the mapped broadcast information to IFFT section 110.

The control information, transmission data or broadcast signal mapped by mapping section 109 to a plurality of subcarriers in a plurality of downlink unit bands is transformed by IFFT section 110 from a frequency domain signal into a time domain signal, transformed into an OFDM signal with a CP added by CP adding section 111, subjected to transmission processing such as D/A conversion, amplification and up-conversion in radio transmitting section 112 and transmitted to terminal 200 via an antenna.

Radio receiving section 113 receives a response signal or reference signal transmitted from terminal 200 via the antenna and performs reception processing such as down-conversion and A/D conversion on the response signal or reference signal.

CP removing section 114 removes a CP added to the response signal or reference signal after the reception processing.

PUCCH extraction section 115 extracts an uplink control channel signal included in the received signal for each PUCCH region and distributes the extracted signals. This uplink control channel signal may include a response signal and a reference signal transmitted from terminal 200.

Despreading section 116-N, correlation processing section 118-N and decision section 119-N perform processing on the uplink control channel signal extracted in PUCCH region N. Base station 100 is provided with processing systems of despreading section 116, correlation processing section 118 and decision section 119 corresponding to respective PUCCH regions 1 to N used by base station 100.

To be more specific, despreading section 116 despreads a signal corresponding to a response signal with an orthogonal code sequence for terminal 200 to use for secondary-spreading in the respective PUCCH regions and outputs the despread signal to correlation processing section 118. Furthermore, despreading section 116 despreads a signal corresponding to the reference signal with an orthogonal code sequence for terminal 200 to use to spread the reference signal in the respective uplink unit bands and outputs the despread signal to correlation processing section 118.

Sequence control section 117 generates a ZAC sequence that may be possibly used to spread a response signal and reference signal transmitted from terminal 200. Furthermore, sequence control section 117 identifies a correlation window in which signal components from terminal 200 should be included in PUCCH regions 1 to N respectively based on code resources (e.g., amount of cyclic shift) that may be possibly used by terminal 200. Sequence control section 117 then outputs the information indicating the identified correlation window and the generated ZAC sequence to correlation processing section 118.

Correlation processing section 118 calculates a correlation value between the signal inputted from despreading section 116 and the ZAC sequence that may be possibly used for primary spreading in terminal 200 using information indicating the correlation window inputted from sequence control section 117 and the ZAC sequence and outputs the correlation value to decision section 119.

Decision section 119 decides whether the response signal transmitted from the terminal indicates ACK or NACK, or DTX with respect to the data transmitted in their respective downlink unit bands based on the correlation value inputted from correlation processing section 118. That is, decision section 119 decides, when the magnitude of the correlation value inputted from correlation processing section 118 is a threshold or below, that terminal 200 is transmitting neither ACK nor NACK using the resources, and further decides, when the magnitude of the correlation value is the threshold or above, which constellation point the response signal indicates through coherent detection. Decision section 119 then outputs the decision result in each PUCCH region to retransmission control signal generation section 120.

Retransmission control signal generation section 120 decides whether or not to retransmit the data transmitted in each downlink unit band based on the information inputted from decision section 119 and generates a retransmission control signal based on the decision result.

That is, retransmission control signal generation section 120 initially decides in which PUCCH region corresponding to decision sections 119-1 to N a maximum correlation value is detected. Next, retransmission control signal generation section 120 individually generates an ACK signal or NACK signal for the data transmitted in each downlink unit band depending on which constellation point the response signal transmitted in the PUCCH region where the maximum correlation value is detected and outputs the ACK signal or NACK signal to data transmission control section 107. However, when all correlation values detected in each PUCCH region are equal to or below a threshold, retransmission control signal generation section 120 decides that no response signal is transmitted from terminal 200, generates DTX for all downlink data and outputs the DTX to data transmission control section 107.

Details of the processing of decision section 119 and retransmission control signal generation section 120 will be described later.

[Configuration of Terminal]

Figure 5:
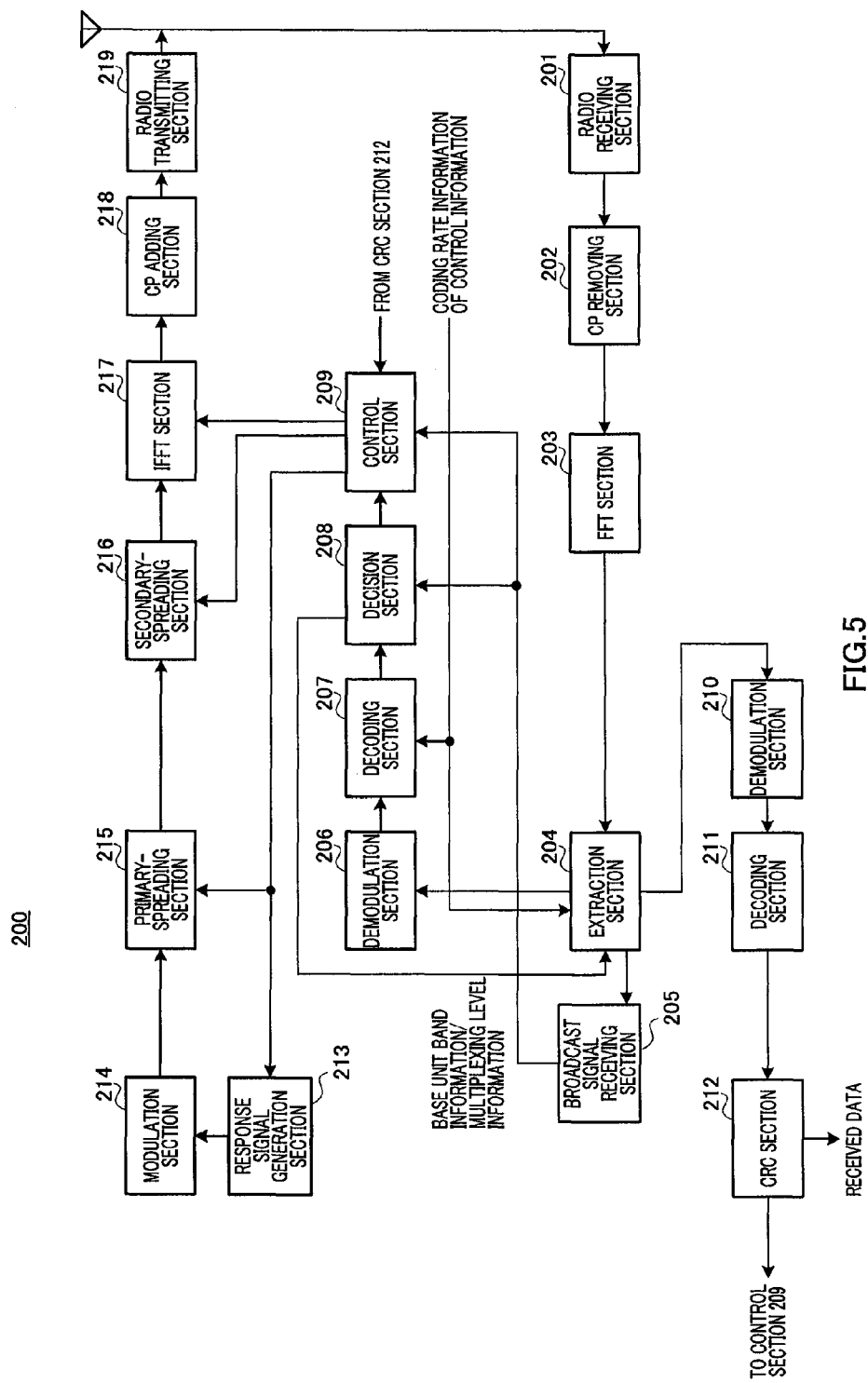
FIG. 5 is a block diagram showing a configuration of a terminal according to Embodiment 1 of the present invention.

FIG. 5 is a block diagram showing a configuration of terminal 200 according to Embodiment 1 of the present invention. In FIG. 5, terminal 200 includes radio receiving section 201, CP removing section 202, FFT section 203, extraction section 204, broadcast signal receiving section 205, demodulation section 206, decoding section 207, decision section 208, control section 209, demodulation section 210, decoding section 211, CRC section 212, response signal generation section 213, modulation section 214, primary-spreading section 215, secondary-spreading section 216, IFFT section 217, CP adding section 218 and radio transmitting section 219.

Radio receiving section 201 receives an OFDM signal transmitted from base station 100 via an antenna and performs reception processing such as down-conversion, A/D conversion on the received OFDM signal.

CP removing section 202 removes a CP added to the OFDM signal after the reception processing.

FFT section 203 applies FFT to the received OFDM signal, transforms the OFDM signal into a frequency domain signal and outputs the received signal obtained to extraction section 204.

Extraction section 204 extracts a broadcast signal from the received signal received from FFT section 203 and outputs the broadcast signal to broadcast signal receiving section 205. Since resources to which the broadcast signal is mapped are predetermined, extraction section 204 extracts information mapped to the resources. Furthermore, the extracted broadcast signal includes information on the association between each downlink unit band and uplink unit band and information on the number of PUCCH resources included in each PUCCH region.

Furthermore, extraction section 204 extracts a downlink control channel signal (PDCCH signal) from the received signal received from FFT section 203 according to the inputted coding rate information. That is, since the number of CCEs making up downlink control information allocation resources changes according to the coding rate, extraction section 204 extracts a downlink control channel signal using a number of CCEs corresponding to the coding rate as an extraction unit. Furthermore, the downlink control channel signal is extracted for each downlink unit band. The extracted downlink control channel signal is outputted to demodulation section 206.

Furthermore, extraction section 204 extracts downlink data from the received signal based on the information on the downlink data allocation resources directed to the terminal received from decision section 208 and outputs the downlink data to demodulation section 210.

Broadcast signal receiving section 205 decodes each broadcast signal included in each downlink unit band and extracts information of an uplink unit band forming a pair with each downlink unit band (that is, information of the uplink unit band reported by SIB2 mapped to each downlink unit band). Furthermore, broadcast signal receiving section 205 recognizes the downlink unit band that forms a pair with the uplink unit band included in the unit band group directed to the terminal as a "base unit band" and outputs the base unit band information to decision section 208 and control section 209.

Furthermore, broadcast signal receiving section 205 extracts information on the number of codes multiplexed in each PUCCH region provided in correspondence with each downlink unit band (that is, information on the number of PUCCH resources per unit time/frequency resource defined in each PUCCH region (multiplexing level information)) and outputs the information to control section 209.

Demodulation section 206 demodulates the downlink control channel signal received from extraction section 204 and outputs the demodulation result obtained to decoding section 207.

Decoding section 207 decodes the demodulation result received from demodulation section 206 according to the coding rate information inputted and outputs the decoding result obtained to decision section 208.

Decision section 208 makes a blind decision as to whether or not the control information included in the decoding result received from decoding section 207 is control information directed to the terminal. This decision is made based on the unit of the decoding result with respect to the above-described extraction unit. For example, decision section 208 demasks the CRC bit with the terminal ID of the terminal and decides that control information with CRC=OK (no error) is control information directed to the terminal. Decision section 208 then outputs information on the downlink data allocation resources for the terminal included in the control information directed to the terminal to extraction section 204. Furthermore, decision section 208 outputs a DAI included in the control information directed to the terminal to control section 209.

Furthermore, decision section 208 identifies a CCE to which the above-described control information directed to the terminal is mapped on the downlink control channel of the base unit band and outputs identification information of the identified CCE to control section 209.

Control section 209 identifies PUCCH resources (frequency/code) corresponding to the CCE indicated by the CCE identification information received from decision section 208. That is, control section 209 identifies PUCCH resources in the basic region of the uplink control channel (that is, "basic PUCCH resources") based on the CCE identification information. However, control section 209 stores information on the PUCCH resources in an additional region for channel selection reported from base station 100 to terminal 200 (that is, "additional PUCCH resources").

Control section 209 determines which of the basic PUCCH resource or additional PUCCH resource is used to transmit a response signal based on the situation of success/failure in reception of the downlink data in each downlink unit band inputted from CRC section 212. That is, control section 209 determines which of the basic PUCCH resource or additional PUCCH resource is used to transmit a response signal according to a pattern of error detection results regarding a plurality of pieces of downlink data. Furthermore, control section 209 determines which constellation point is set for the response signal based on the situation of success/failure in reception of downlink data in each downlink unit band inputted from CRC section 212.

Control section 209 then outputs information on the constellation point to be set to response signal generation section 213, outputs the ZAC sequence and amount of cyclic shift corresponding to the PUCCH resources to be used to primary-spreading section 215 and outputs frequency resource information to IFFT section 217. Furthermore, control section 209 outputs an orthogonal code sequence corresponding to the PUCCH resources to be used to secondary-spreading section 216. Details of control over PUCCH resources and constellation points by control section 209 will be described later.

Demodulation section 210 demodulates the downlink data received from extraction section 204 and outputs the demodulated downlink data to decoding section 211.

Decoding section 211 decodes the downlink data received from demodulation section 210 and outputs the decoded downlink data to CRC section 212.

CRC section 212 generates the decoded downlink data received from decoding section 211, performs error detection for each downlink unit band using a CRC and outputs ACK when CRC=OK (no error) and NACK when CRC=NG (error present) to control section 209. Furthermore, when CRC=OK (no error), CRC section 212 outputs the decoded downlink data as the received data.

Response signal generation section 213 generates a response signal and reference signal based on the constellation points of the response signal instructed from control section 209 and outputs the response signal and reference signal to modulation section 214.

Modulation section 214 modulates the response signal inputted from response signal generation section 213 and outputs the modulated response signal to primary-spreading section 215.

Primary-spreading section 215 primary-spreads the response signal and reference signal based on the ZAC sequence and amount of cyclic shift set by control section 209 and outputs the primary-spread response signal and reference signal to secondary-spreading section 216. That is, primary-spreading section 215 primary-spreads the response signal and reference signal according to the instruction from control section 209.

Secondary-spreading section 216 secondary-spreads the response signal and reference signal using an orthogonal code sequence set by control section 209 and outputs the secondary-spread signal to IFFT section 217. That is, secondary-spreading section 216 secondary-spreads the primary-spread response signal and reference signal using an orthogonal code sequence corresponding to the PUCCH resources selected by control section 209 and outputs the spread signal to IFFT section 217.

CP adding section 218 adds the same signal as that of the rear part of the signal after the IFFT at the head of the signal as a CP.

Radio transmitting section 219 performs transmission processing such as D/A conversion, amplification and up-conversion on the signal inputted. Radio transmitting section 219 then transmits the signal to base station 100 from the antenna.

[Operations of Base Station 100 and Terminal 200]

Figure 6B:
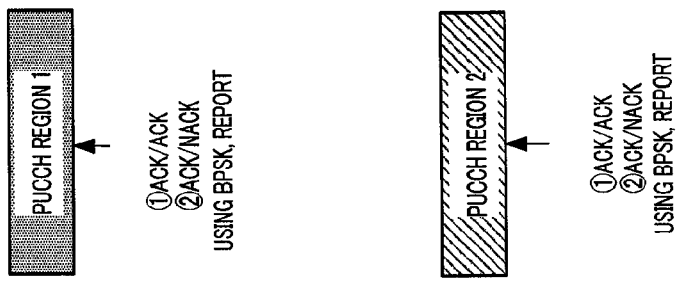
FIG. 6A and FIG. 6B are diagrams illustrating operations of the base station and terminal.
Figure 6A:
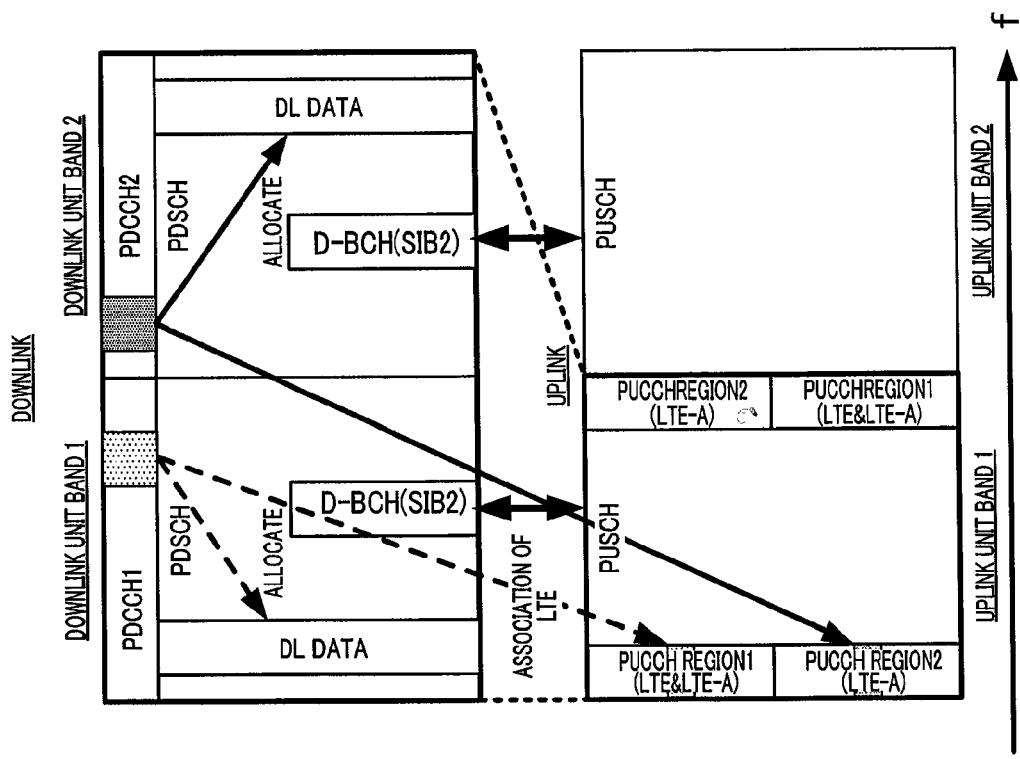
Figure 7:
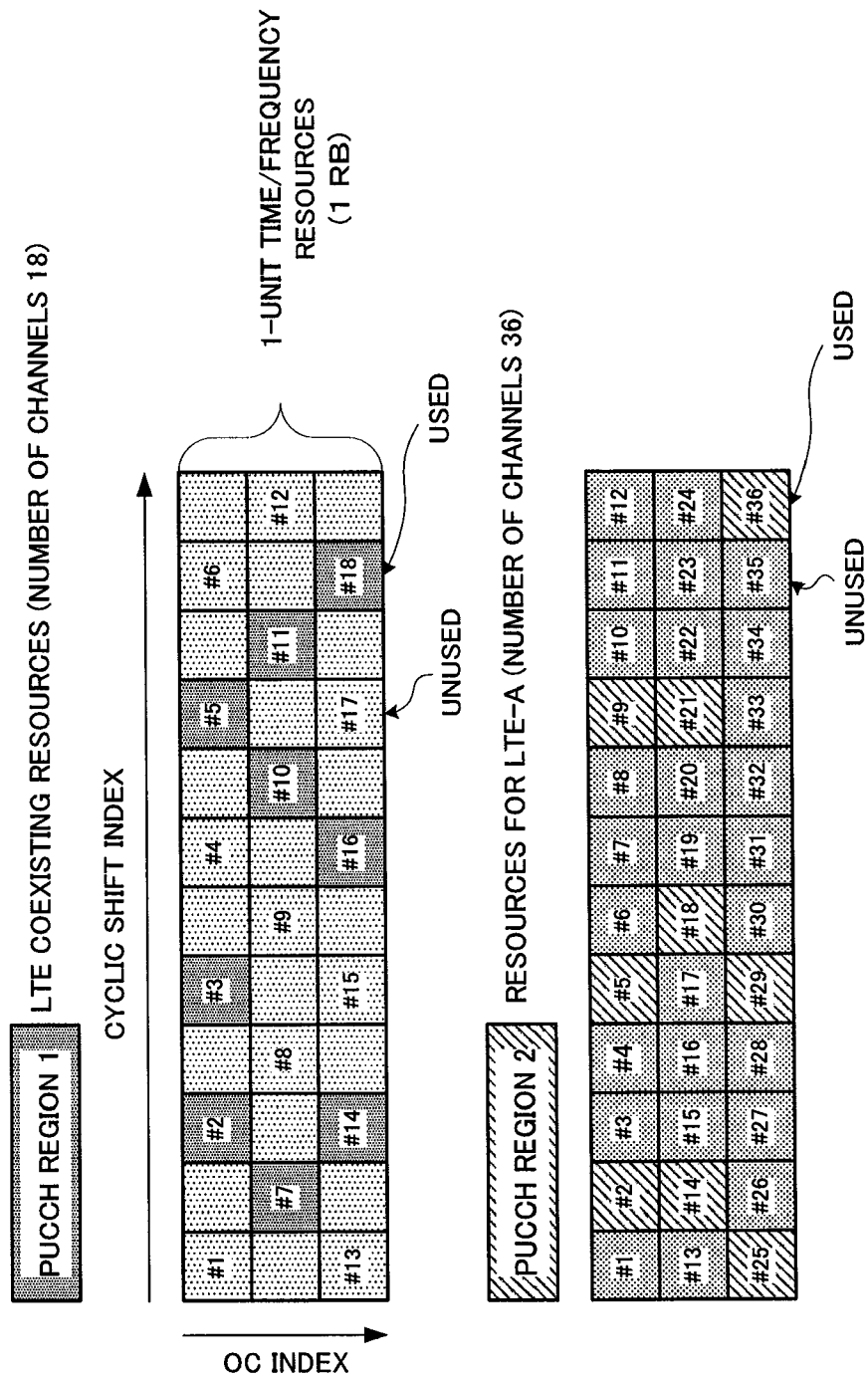
FIG. 7 is a diagram illustrating operations of the base station and terminal.

Operations of base station 100 and terminal 200 having the above-described configurations will be described. FIG. 6A, FIG. 6B and FIG. 7 are diagrams illustrating operations of base station 100 and terminal 200.

<Control by Base Station 100 Over PUCCH Multiplexing Level in Unit Time/Frequency Resources>

In base station 100, control section 101 sets the multiplexing level of a PUCCH signal in each PUCCH region independently of each other.

For example, in FIG. 7, 18 PUCCH resources #1 to 18 per unit time/frequency resource are defined in PUCCH region 1 (that is, region where a response signal from an LTE terminal and a response signal from an LTE-A terminal coexist). On the other hand, 36 PUCCH resources #1 to 36 per unit time/frequency resource are defined in PUCCH region 2 (that is, additional PUCCH region reported to LTE-A terminal). Basic PUCCH resources directed to terminal 200 are included in PUCCH region 1 and additional PUCCH resources directed to terminal 200 are included in PUCCH region 2.

Thus, base station 100 sets a multiplexing level per unit time/frequency resource in each PUCCH region independently of each other. To be more specific, this multiplexing level is identified by the number of positions out of positions that can be taken as a cyclic shift index. To be more specific, the multiplexing level is identified based on the interval at which positions are used. In FIG. 7, 12 positions can be taken for one sequence. A sequence corresponding to every one cyclic shift index is used in PUCCH region 1, while a cyclic shift sequence corresponding to all 12 cyclic shift indices is used in PUCCH region 2. That is, positions are used at 0 intervals in PUCCH region 2. Therefore, in FIG. 7, 18 PUCCH resources are provided in PUCCH region 1, while 36 PUCCH resources are provided in PUCCH region 2. That is, more boxes (that is, PUCCH resources) are provided for accommodating PUCCH signals in PUCCH region 2 than in PUCCH region 1.

Furthermore, PUCCH resources in PUCCH region 1 are associated with CCEs in the respective base unit bands in a one-to-one correspondence and information on this association is shared between base station 100 and terminal 200 beforehand.

<Reception of Downlink Data by Terminal 200>

In terminal 200, broadcast signal receiving section 205 identifies a downlink unit band to transmit a BCH for broadcasting information on the uplink unit band making up the unit band group reported to terminal 200 as a base unit band.

Furthermore, decision section 208 decides whether or not downlink allocation control information directed to the terminal is included in a downlink control channel of each downlink unit band and outputs the downlink allocation control information directed to the terminal to extraction section 204.

Extraction section 204 extracts downlink data from the received signal based on the downlink allocation control information received from decision section 208.

Thus, terminal 200 can receive downlink data transmitted from base station 100.

Explaining more specifically with reference to FIG. 6A, since a BCH for broadcasting information on uplink unit band 1 is transmitted in downlink unit band 1 first, downlink unit band 1 becomes the base unit band of terminal 200.

Furthermore, the downlink allocation control information transmitted in downlink unit band 1 includes information on resources used to transmit downlink data (DL data) transmitted in downlink unit band 1 and the downlink allocation control information transmitted in downlink unit band 2 includes information on resources used to transmit downlink data transmitted in downlink unit band 2.

Therefore, by receiving the downlink allocation control information transmitted in downlink unit band 1 and the downlink allocation control information transmitted in downlink unit band 2, terminal 200 can receive downlink data in both downlink unit band 1 and downlink unit band 2. On the contrary, when the terminal cannot receive downlink allocation control information in a certain downlink unit band, terminal 200 cannot receive downlink data in the downlink unit band.

Furthermore, terminal 200 can recognize the downlink unit band in which downlink allocation control information is transmitted through a DAI transmitted in each downlink unit band.

<Response by Terminal 200>

CRC section 212 performs error detection on downlink data corresponding to the downlink allocation control information that has been successfully received and outputs the error detection result to control section 209.

Control section 209 then performs transmission control over a response signal based on the error detection result received from CRC section 212 as follows.

That is, as shown in FIG. 6B, when both the error detection result regarding the downlink data transmitted in the base unit band and the error detection result regarding the downlink data transmitted in other than the base unit band are "no error" (that is, ACK/ACK), control section 209 transmits a response signal using basic PUCCH resources (that is, resources of PUCCH region 1). A first constellation point (e.g., (I,Q)=(1,0) or the like) is used for the response signal in this case. Furthermore, as described above, the basic PUCCH resources are determined in association with CCEs occupied by the downlink allocation control information transmitted to terminal 200 in the base unit band.

Furthermore, when both the error detection result regarding the downlink data transmitted in the base unit band and the error detection result regarding the downlink data transmitted in other than the base unit band are "error present" (that is, NACK/NACK), control section 209 transmits a response signal using additional PUCCH resources (that is, resources of PUCCH region 2). A second constellation point (e.g., (I,Q)=(−1,0) or the like) is used for the response signal in this case. The information of additional PUCCH resources is shared between base station 100 and terminal 200 beforehand as described above.

Furthermore, when the downlink data transmitted in the base unit band is "no error" and the downlink data transmitted in other than the base unit band is "error present" (that is, ACK/NACK), control section 209 transmits a response signal using the basic PUCCH resources. A second constellation point (that is, (I,Q)=(−1,0) or the like) is used for the response signal in this case.

Furthermore, when the downlink data transmitted in the base unit band is "error present" and the downlink data transmitted in other than the base unit band is "no error" (that is, NACK/ACK), control section 209 transmits a response signal using additional PUCCH resources. A first constellation point (that is, (I,Q)=(1,0) or the like) is used for the response signal in this case.

Thus, response signals corresponding to two error detection result patterns are mapped to the basic PUCCH resources and additional PUCCH resources respectively. Therefore, BPSK having two constellation points is used.

When the terminal receives downlink allocation control signals in some of the plurality of downlink unit bands and although the terminal recognizes that downlink data is allocated in other downlink unit bands through a DAI included therein, the terminal fails to receive the downlink allocation control signals in the other downlink unit bands and cannot thereby receive downlink data (that is, a DTX occurs in the other downlink unit bands), this case is treated in the same way as in a case with "error present" in the downlink unit band where the terminal fails to receive the downlink allocation control signal.

Here, the base station generally controls the coding rate and modulation scheme of downlink data so that the assumed error rate (Target Block Error Rate: Target BLER) of downlink data is on the order of 0% to 30% (operation assuming the error rate to be on the order of 10% is most typical). Thus, the possibility that the error detection result with respect to downlink data may be "no error" on the terminal side is higher than the possibility that the error detection result may be "error present." That is, as shown in FIG. 6B, when there are two downlink unit bands included in the unit band group, the probability that errors may be detected in none of downlink data transmitted in the respective downlink unit bands is approximately 81%, while the probability that errors may be detected in both of downlink data is approximately 1%.

Therefore, it is possible to suppress the frequency with which the additional region is used to a low level by transmitting a bundled response signal (that is, response signal where resources and constellation points to be used are determined through operation of Channel Selection) using resources in the basic region associated with the downlink control channel of the base unit band when errors are detected in none of the plurality of pieces of downlink data transmitted in a plurality of downlink unit bands included in the unit band group or transmitting a bundled response signal using resources in the additional region when errors are detected in all pieces of downlink data. Moreover, even when the multiplexing level in unit time/frequency resources included in the additional region is increased to minimize increases in overhead due to the additional region, the frequency with which the bundled response signal is mapped to the additional region is suppressed to a low level, and increases in inter-code interference are also thereby suppressed.

Thus, it is possible to prevent deterioration of transmission characteristics of a response signal and also minimize increases in overhead to the uplink control channel.

That is, in the LTE-A system, even when the maximum allowable number of codes multiplexed is increased to drastically reduce the number of time/frequency resources occupied by the PUCCH region (that is, PUCCH region 2) additionally required for the LTE system, it is possible to reduce the influence of inter-code interference caused by an increase in the maximum allowable number of codes multiplexed by reducing the probability that additional PUCCH resources may be used (that is, control of channel selection is performed whereby basic PUCCH resources are used when all downlink data shows "no error" or additional PUCCH resources are used when all downlink data shows "error present").

As described above, according to the present embodiment, control section 209 in terminal 200 transmits a bundled response signal using resources in the basic region of the uplink control channel in the uplink unit band associated with the downlink control channel of the base unit band which is the downlink unit band for transmitting a broadcast channel signal including information on the uplink unit band of the unit band group when errors are detected in none of the plurality of pieces of downlink data of the unit band group or transmits a bundled response signal using resources in the additional region of the uplink control channel when errors are detected in all of the plurality of pieces of downlink data.

By so doing, it is possible to reduce the frequency with which the bundled response signal is mapped to the additional region compared to the basic region. Since the frequency with which the bundled response signal is mapped to the additional region can be suppressed to a low level, it is possible to prevent inter-code interference from increasing, at the same time increase the multiplexing level of the additional region and minimize increases in overhead due to the additional region.

A case has been described above assuming that information on the additional PUCCH resources is shared beforehand between base station 100 and terminal 200. That is, it is assumed that information on the additional PUCCH resources is explicitly reported from base station 100 to terminal 200. However, the present invention is not limited to this, but additional PUCCH resources as well as basic PUCCH resources may also be defined in association with CCEs occupied by downlink allocation control information transmitted in other than the base unit band (that is, implicit additional PUCCH resource signaling may be applied). By so doing, it is possible to reduce signaling overhead regarding the additional PUCCH resources.

Furthermore, when additional PUCCH resources are associated with CCEs occupied by downlink allocation control information transmitted in other than the base unit band, a plurality of CCEs (e.g. m continuous CCEs) in other than the base unit band may be associated with one additional PUCCH resource to reduce the number of additional PUCCH resources. By so doing, the number of additional PUCCH resources to be defined in the additional region of the uplink control channel is reduced to the number of CCEs/m, and therefore PUCCH overhead is further reduced.

The above explanation presupposes that the basic region including basic PUCCH resources does not overlap with the additional region including additional PUCCH resources. However, the present invention is not limited to this, but the basic region may partially or totally overlap with the additional region. In short, the base station side needs only to perform control such that the basic PUCCH resources and additional PUCCH resources that should be recognized by a certain terminal in a certain subframe are different from each other. Base station 100 provides the basic region and additional region overlapping with each other in this way, and PUCCH overhead in the present system is thereby reduced to the equivalent of that of an LTE system.

A case has been described above where a ZAC sequence is used for primary-spreading and an orthogonal code sequence is used for secondary-spreading. However, the present invention may also use non-ZAC sequences which are mutually separable by different cyclic shift indices for primary-spreading. For example, GCL (Generalized Chirp like) sequence, CAZAC (Constant Amplitude Zero Auto Correlation) sequence, ZC (Zadoff-Chu) sequence, M sequence, PN sequence such as orthogonal gold code sequence or a sequence randomly generated by a computer and having an abrupt auto-correlation characteristic on the time axis or the like may be used for primary-spreading. Furthermore, sequences orthogonal to each other or any sequences may be used as orthogonal code sequences for secondary-spreading as long as they are regarded as sequences substantially orthogonal to each other. For example, a Walsh sequence or Fourier sequence or the like may be used for secondary-spreading as an orthogonal code sequence. In the above descriptions, resources (e.g., PUCCH resources) of response signals are defined by a cyclic shift index of a ZAC sequence and a sequence number of an orthogonal cover index.

Embodiment 2

A case has been described in Embodiment 1 assuming that when the terminal generates a response signal, a case of failing to receive downlink data is treated the same as a case of failing to receive a downlink allocation control signal. In Embodiment 2, when the terminal generates a response signal, a case of failing to receive downlink data is distinguished from a case of failing to receive a downlink allocation control signal. In Embodiment 2, this allows the base station side to distinguish whether the terminal fails to receive downlink data in each unit band or fails to receive a downlink allocation control signal, thus enabling more effective retransmission control.

This will be described more specifically below. Since the configurations of the base station and terminal according to Embodiment 2 are similar to those of Embodiment 1, the present embodiment will be described using FIG. 4 and FIG. 5.

In terminal 200 according to Embodiment 2, control section 209 determines which of basic PUCCH resources or additional PUCCH resources are used to transmit a response signal according to a pattern of success/failure in reception of a plurality of downlink allocation control signals and a pattern of error detection results of a plurality of pieces of downlink data.

To be more specific, control section 209 performs the following transmission control over a response signal based on a pattern of success/failure in reception of a plurality of downlink allocation control signals and a pattern of error detection results of a plurality of pieces of downlink data.

That is, when control section 209 receives downlink allocation control information in a base unit band and downlink unit bands other than the base unit band, if all error detection results regarding downlink data transmitted in the base unit band and downlink data transmitted in other than the base unit band show "no error," control section 209 transmits a response signal using basic PUCCH resources. A first constellation point (e.g., (I,Q)=(1,0) or the like) is used for the response signal in this case. Furthermore, as described above, basic PUCCH resources are determined in association with CCEs occupied by the downlink allocation control information transmitted to terminal 200 in the base unit band.

Furthermore, when control section 209 receives downlink allocation control information in the base unit band and other downlink unit bands, if downlink data transmitted in the base unit band shows "no error" and downlink data transmitted in other than the base unit band shows "error present," control section 209 transmits a response signal using basic PUCCH resources. A second constellation point (that is, (I,Q)=(−1,0) or the like) is used for the response signal in this case.

Furthermore, when control section 209 receives downlink allocation control information in the base unit band and other downlink unit bands, if downlink data transmitted in the base unit band shows "error present" and downlink data transmitted in other than the base unit band shows "no error," control section 209 transmits a response signal using basic PUCCH resources. A third constellation point (that is, (I,Q)=(0,j) or the like) is used for the response signal in this case.

Furthermore, when control section 209 receives downlink allocation control information in the base unit band and other downlink unit bands, if both downlink data transmitted in the base unit band and downlink data transmitted in other than the base unit band show "error present," control section 209 transmits a response signal using basic PUCCH resources. A fourth constellation point (that is, (I,Q)=(0,−j) or the like) is used for the response signal in this case.

Furthermore, when control section 209 receives downlink allocation control information in only one of the base unit band and downlink unit bands other than the base unit band, if a DAI included in the downlink allocation control information indicates that downlink data is present in both the base unit band and downlink unit bands other than the base unit band, control section 209 transmits a response signal using additional PUCCH resources. That is, when DTX occurs, control section 209 transmits a response signal using additional PUCCH resources. However, since the information on the additional PUCCH resources is shared beforehand between base station 100 and terminal 200 as described above, terminal 200 can reliably grasp additional PUCCH resources to be used even when it fails to receive downlink allocation control information in the base unit band.

When control section 209 receives downlink allocation control information in only downlink unit bands other than the base unit band, if error detection results regarding the downlink data transmitted in the other downlink unit bands show "no error," control section 209 uses a first constellation point (that is, (I,Q)=(1,0) or the like) as the response signal.

Furthermore, when control section 209 receives downlink allocation control information in only downlink unit bands other than the base unit band, if error detection results regarding the downlink data transmitted in the other downlink unit bands show "error present," control section 209 uses a second constellation point (that is, (I,Q)=(−1,0) or the like) as the response signal.

Furthermore, when control section 209 receives downlink allocation control information in only the base unit band, if error detection results regarding the downlink data transmitted in the base unit band show "no error," control section 209 uses a third constellation point (that is, (I,Q)=(0,j) or the like) as the response signal.

Furthermore, when control section 209 receives downlink allocation control information in only the base unit band, if error detection results regarding the downlink data transmitted in the base unit band show "error present," control section 209 uses a fourth constellation point (that is, (I,Q)=(0,−j) or the like) as the response signal.

Thus, response signals corresponding to four patterns of success/failure in reception of downlink allocation control information and error detection results are mapped to the basic PUCCH resources and additional PUCCH resources respectively. Therefore, QPSK having four constellation points is used.

Figure 8:
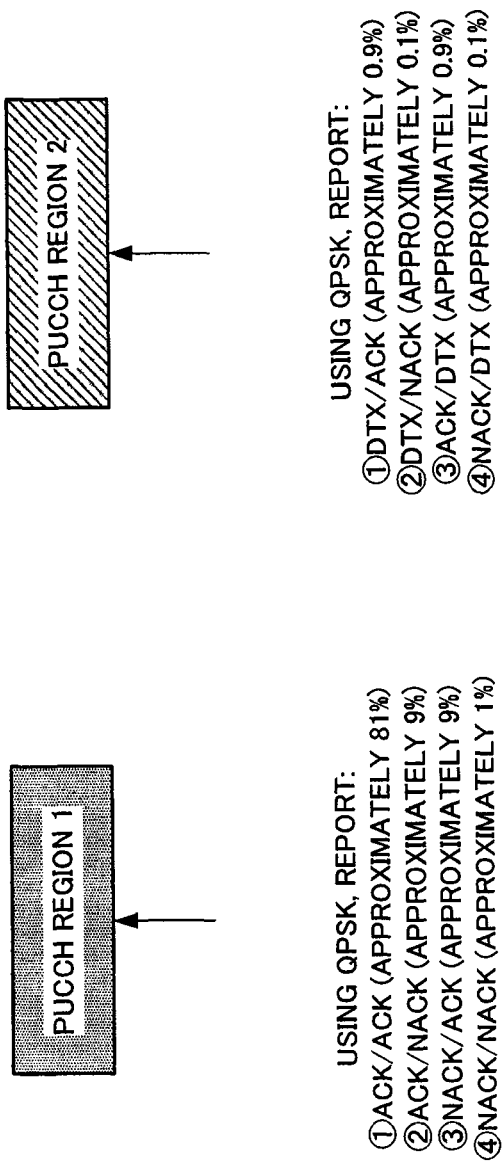
FIG. 8 is a diagram illustrating operations of a base station and terminal according to Embodiment 2 of the present invention.

Here, the base station generally controls the coding rate and modulation scheme of downlink allocation control information so that the assumed error rate of the downlink allocation control information is on the order of 0% to 1%. That is, the probability that the terminal side may fail to receive downlink allocation control information, that is, the probability that DTX may occur is very low. That is, as shown in FIG. 8, the probability that DTX may occur is approximately 2% at most even when probabilities of all four patterns are summed up.

Therefore, by transmitting a bundled response signal using resources in the additional region only when DTX occurs, it is possible to further suppress the frequency with which the additional region is used to a lower level than Embodiment 1. This makes it possible to further suppress increases in overhead of the uplink channel while suppressing increases in inter-code interference.

Embodiment 3

Cases have been described in Embodiments 1 and 2 where the base station transmits downlink allocation control information including information (that is, DAI) as to whether or not downlink data is transmitted in a downlink unit band to the terminal, but Embodiment 3 is different from Embodiments 1 and 2 in that the base station transmits no DAI.

Figure 2B:
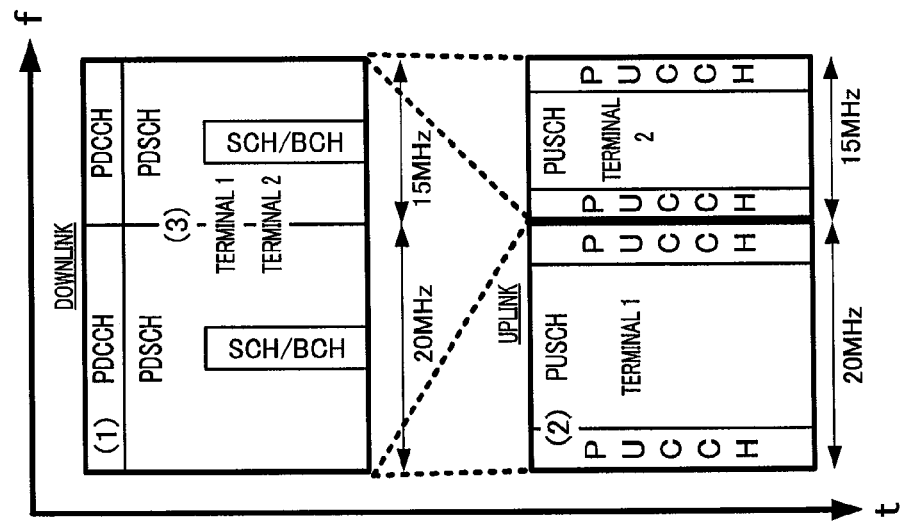
FIG. 2A and FIG. 2B are diagrams illustrating asymmetric carrier aggregation applied to individual terminals and a control sequence thereof.
Figure 2A:
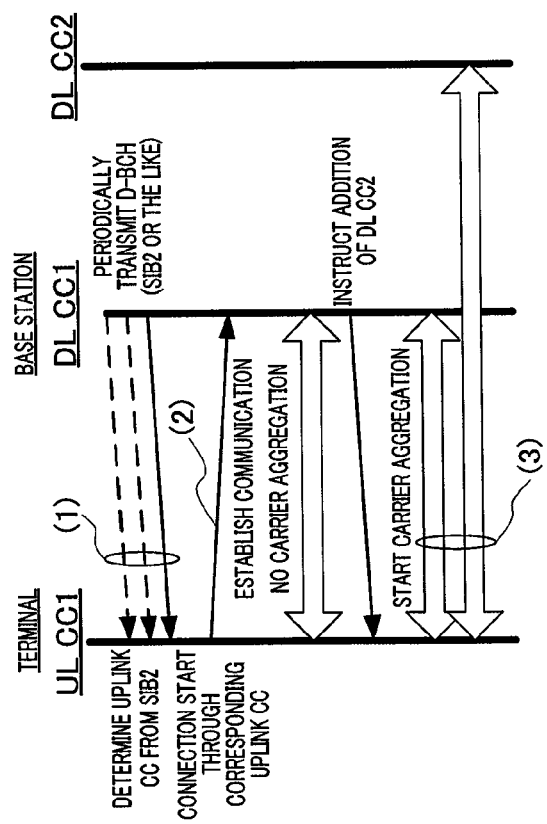

Furthermore, in Embodiment 3, the base station sets one of a plurality of downlink unit bands set in the terminal as a "preferential downlink unit band" (may be referred to as "Primary Component carrier" or "Anchor Carrier") in the terminal. However, the preferential downlink unit band may also be set as the downlink unit band used for terminal 400 to establish communication shown in FIG. 2A (that is, downlink unit band used for Initial Access process before performing carrier aggregation communication). Alternatively, the preferential downlink unit band may be individually reported (Dedicated signaling) to terminal 400 from base station 300 independently of Initial Access process. This preferential downlink unit band is a downlink unit band preferentially used when there is only one piece of downlink data from the base station to the terminal (that is, when the base station does not require communication using carrier aggregation) and the preferential downlink unit band has a higher probability that it may be used to transmit downlink data than other downlink unit bands (Non-Primary Component carrier or Non-Anchor Carrier).

[Overview of Communication System]

In the communication system including base station 300 and terminal 400, which will be described later, communication using an uplink unit band and a plurality of downlink unit bands associated with the uplink unit band, that is, communication using asymmetric carrier aggregation specific to terminal 400 is performed. Furthermore, as in the cases of Embodiments 1 and 2, this communication system also includes terminals, unlike terminal 400, that has no capability to perform communication using carrier aggregation and performs communication using one downlink unit band and one uplink unit band associated therewith (that is, communication without using carrier aggregation).

Therefore, base station 300 is configured to be able to support both communication using asymmetric carrier aggregation and communication without using carrier aggregation.

Furthermore, communication without using carrier aggregation can also be performed between base station 300 and terminal 400 depending on resource allocation by base station 300 to terminal 400. However, when performing communication without using carrier aggregation with terminal 400, base station 300 uses only one "preferential downlink unit band" set beforehand in terminal 400.

Furthermore, this communication system adopts channel selection in ARQ regardless of whether or not communication using carrier aggregation is performed. That is, when downlink data is transmitted without using some of the plurality of downlink unit bands set by base station 300 beforehand in terminal 400, the terminal 400 side sets feedback on the some unused downlink unit bands as DTX and performs channel selection operation. However, when terminal 400 cannot detect even one piece of downlink allocation control information (and downlink data), terminal 400 transmits no response signal.

Descriptions will be given below assuming the following matters as premises. That is, asymmetric carrier aggregation specific to terminal 400 is configured beforehand between base station 300 and terminal 400 and information of the downlink unit band and uplink unit band for terminal 400 to use is shared between base station 300 and terminal 400. Furthermore, base station 300 reports information on a "preferential downlink unit band" to terminal 400 beforehand.

[Configuration of Base Station]

Figure 9:
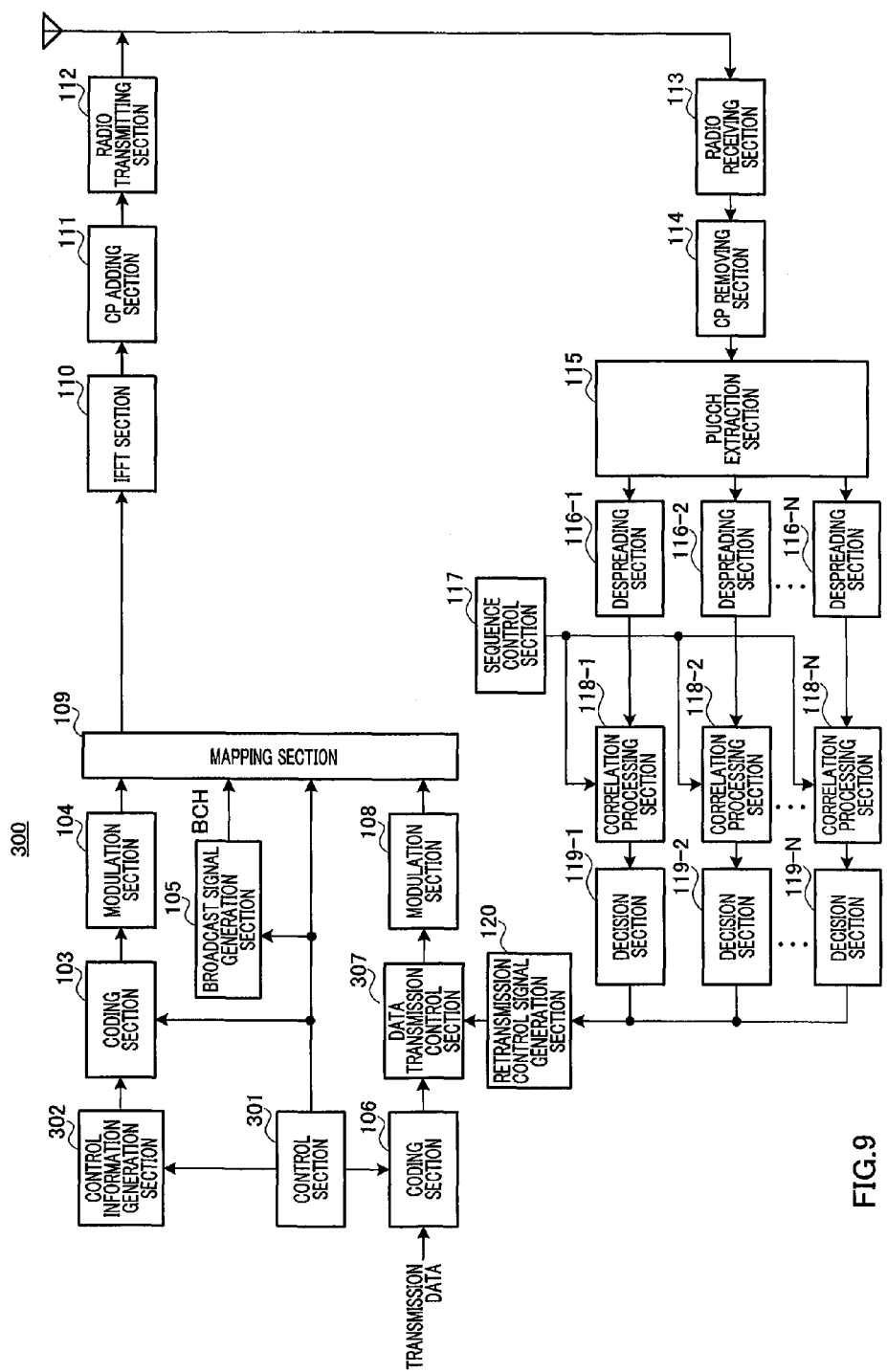
FIG. 9 is a block diagram showing a configuration of a base station according to Embodiment 3 of the present invention.

Control section 301 of base station 300 shown in FIG. 9 allocates (assigns), as in the case of Embodiments 1 and 2, downlink resources to transmit control information (that is, downlink control information allocation resources) and downlink resources to transmit downlink data included in the control information (that is, downlink data allocation resources) to resource allocation target terminal 400.

Furthermore, control section 301 controls terminal 400 so as to use communication without using carrier aggregation (that is, when the number of downlink unit bands for allocating downlink data to terminal 400 is only one) and "preferential downlink unit band" for terminal 400. However, unlike Embodiments 1 and 2, control section 301 does not generate DAI information for resource allocation target terminal 400.

Control section 301 then outputs information on downlink data allocation resources to control information generation section 302.

Upon initial transmission, data transmission control section 307 stores the coded transmission data and also outputs the coded transmission data to modulation section 108. The coded transmission data is stored for each destination terminal 400. Furthermore, transmission data for one destination terminal 400 is stored for each downlink unit band transmitted.

This enables not only retransmission control over the entire data transmitted to destination terminal 400 but also retransmission control over each downlink unit band.

Furthermore, data transmission control section 307 receives NACK for downlink data transmitted in a certain downlink unit band or DTX for the downlink unit band from retransmission control signal generation section 120 and outputs, if the downlink data was actually transmitted in the downlink unit band in a past subframe corresponding to the response signal, stored data corresponding to the downlink unit band to modulation section 108. However, if data transmission control section 307 receives DTX for a certain downlink unit band from retransmission control signal generation section 120 but did not actually transmit the downlink data in the downlink unit band in the corresponding past subframe, data transmission control section 307 ignores the DTX information. That is, regardless of whether or not downlink data was actually transmitted from base station 300 in a certain downlink unit band, if downlink allocation control information is not received (in this case, downlink data is naturally not received), a response signal of terminal 400 for the downlink unit band becomes DTX. Therefore, upon receiving DTX, data transmission control section 307 needs to perform retransmission control depending on whether or not base station 300 has actually transmitted downlink data.

Furthermore, upon receiving ACK for the downlink data transmitted in a certain downlink unit band from retransmission control signal generation section 120, data transmission control section 307 deletes the stored data corresponding to the downlink unit band.

[Configuration of Terminal]

Figure 10:
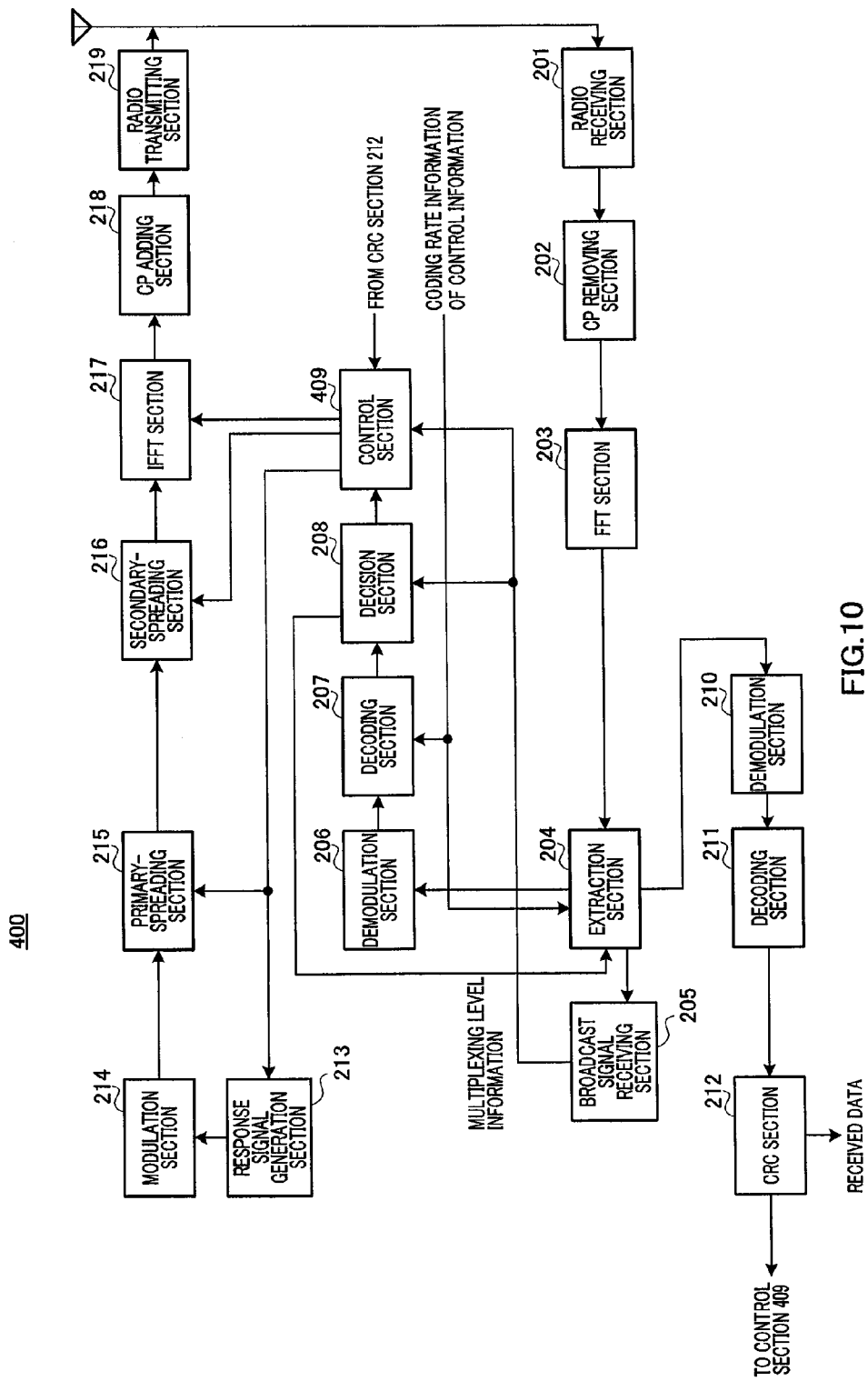
FIG. 10 is a block diagram showing a configuration of a terminal according to Embodiment 3 of the present invention.

Control section 409 of terminal 400 in FIG. 10 identifies PUCCH resources (frequency/code) corresponding to CCEs indicated by CCE identification information received from decision section 208. That is, as in the cases of Embodiments 1 and 2, control section 409 identifies PUCCH resources (that is, "basic PUCCH resources") in a basic region of an uplink control channel based on the CCE identification information. However, control section 409 stores information on PUCCH resources (that is, "additional PUCCH resources") beforehand in an additional region for channel selection reported from base station 300 to terminal 400.

Control section 409 then determines which of basic PUCCH resources or additional PUCCH resources are used to transmit a response signal based on success/failure in reception of a downlink allocation control signal in each downlink unit band and error detection results on downlink data inputted from CRC section 212. That is, as in the cases of Embodiments 1 and 2, control section 409 determines which of the basic PUCCH resources or additional PUCCH resources are used to transmit a response signal according to a "reception situation pattern" defined by the success/failure of reception of a plurality of downlink allocation control signals and error detection results regarding a plurality of pieces of downlink data. However, unlike Embodiments 1 and 2, control section 409 also selects PUCCH resources based on the operation of channel selection even when communication without using carrier aggregation is applied to downlink data. Furthermore, control section 409 further determines which constellation point is set for the response signal based on the above-described reception situation pattern.

[Operations of Base Station 300 and Terminal 400]

Operations of base station 300 and terminal 400 having the above-described configurations will be described. FIG.

11, FIG. 12A and FIG. 12B are diagrams illustrating operations of base station 300 and terminal 400.

<Control on PUCCH Multiplexing Level in Unit Time/Frequency Resources by Base Station 300>

In base station 300, control section 301 sets a multiplexing level of a PUCCH signal in each PUCCH region (that is, PUCCH region a and PUCCH region b) independently of each other.

Figure 11:
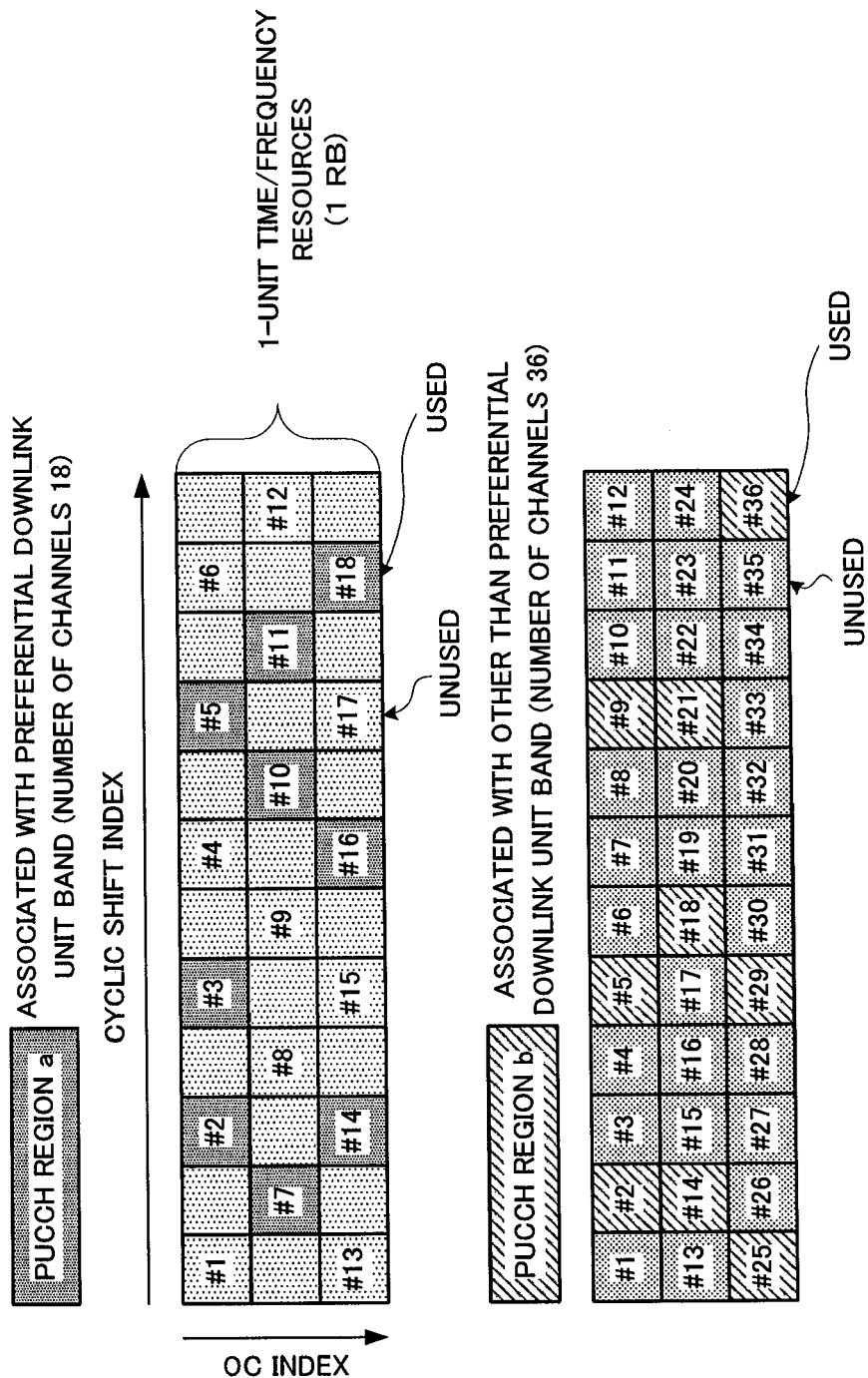
FIG. 11 is a diagram illustrating operations of the base station and terminal.

For example, in FIG. 11, 18 PUCCH resources #1 to 18 per unit time/frequency resource are defined in PUCCH region a (that is, region including PUCCH resource group associated with CCEs of preferential downlink unit band). On the other hand, 36 PUCCH resources #1 to 36 per unit time/frequency resource are defined in PUCCH region b (that is, additional PUCCH region reported to terminal 300). PUCCH resource 1 for terminal 400 is included in PUCCH region a and PUCCH resource 2 for terminal 400 is included in PUCCH region b.

Thus, base station 300 sets a multiplexing level per unit time/frequency resource for each PUCCH region independently of each other as in the cases of Embodiments 1 and 2. Furthermore, PUCCH resources in PUCCH region a are associated with CCEs in a preferential downlink unit band in a one-to-one correspondence and information on this association is shared beforehand between base station 300 and terminal 400.

<Allocation of Downlink Data by Base Station 300>

Base station 300 determines whether or not to transmit downlink data to terminal 400 for each time unit called "subframe." Furthermore, when transmitting downlink data to terminal 400 in a certain subframe, base station 300 also determines how many downlink unit bands are used (allocated). That is, when base station 300 allocates two downlink unit bands to transmit downlink data to terminal 400 in a certain subframe, base station 300 transmits downlink data using both a "preferential downlink unit band" set in terminal 400 and a downlink unit band other than the "preferential downlink unit band." On the other hand, when one downlink unit band is allocated in a certain subframe, base station 300 transmits downlink data using only the "preferential downlink unit band" set in terminal 400. However, when there is no downlink data to be transmitted from base station 300 to terminal 400 in a certain subframe, base station 300 does not transmit downlink data in any downlink unit band.

<Reception of Downlink Data by Terminal 400>

Terminal 400 identifies a preferential downlink unit band based on information reported from base station 300 beforehand.

The report information on this preferential downlink unit band is transmitted through a data channel. Therefore, control section 409 acquires the information on the preferential downlink unit band from the received data received via CRC section 212.

Furthermore, decision section 208 decides whether or not a downlink control channel of each downlink unit band includes downlink allocation control information directed to the terminal and outputs the downlink allocation control information directed to the terminal to extraction section 204.

Extraction section 204 extracts downlink data from the received signal based on the downlink allocation control information received from decision section 208.

Thus, terminal 400 can receive downlink data transmitted from base station 300.

As in the case of Embodiments 1 and 2, downlink allocation control information transmitted in downlink unit band 1 includes information on resources used to transmit downlink data (DL data) transmitted in downlink unit band 1 and downlink allocation control information transmitted in downlink unit band 2 includes information on resources used to transmit downlink data transmitted in downlink unit band 2.

Therefore, terminal 400 receives downlink allocation control information transmitted in downlink unit band 1 and downlink allocation control information transmitted in downlink unit band 2, and can thereby receive downlink data using both downlink unit band 1 and downlink unit band 2. On the contrary, if the terminal cannot receive downlink allocation control information in a certain downlink unit band, terminal 400 cannot receive downlink data in the downlink unit band.

<Response by Terminal 400>

CRC section 212 performs error detection on downlink data corresponding to downlink allocation control information which has been successfully received and outputs the error detection result to control section 409.

Control section 409 then performs transmission control over a response signal based on success/failure in reception of a downlink allocation control signal in each downlink unit band and the error detection result received from CRC section 212 as follows.

That is, as shown in FIG. 12A and FIG. 12B, when both the error detection result regarding downlink data transmitted in the preferential downlink unit band and the error detection result regarding downlink data transmitted in other than the preferential downlink unit band show "no error" (that is, ACK/ACK), control section 409 transmits a response signal using PUCCH resource 1 (that is, resources of PUCCH region a). A first constellation point (e.g., (I,Q)=(0,j) or the like) is used for the response signal in this case. Furthermore, as described above, PUCCH resource 1 is determined in association with CCEs occupied by downlink allocation control information transmitted to terminal 400 in the preferential downlink unit band.

Furthermore, when the error detection result regarding downlink data transmitted in the preferential downlink unit band shows "no error" and when downlink allocation control information is not detected in other than the preferential downlink unit band (that is, ACK/DTX), control section 409 transmits a response signal using PUCCH resource 1 (that is, resources of PUCCH region a). A second constellation point (e.g., (I,Q)=(−1,0) or the like) is used for the response signal in this case. Similarly, when the error detection result regarding downlink data transmitted in the preferential downlink unit band shows "no error" and the error detection result regarding downlink data transmitted in other than the preferential downlink unit band shows "error present" (that is, ACK/NACK), control section 409 also transmits a response signal by setting a second constellation point (e.g., (I,Q)=(−1,0) or the like) in PUCCH resource 1 (that is, resources of PUCCH region a).

Furthermore, when the error detection result regarding downlink data transmitted in the preferential downlink unit band shows "error present" and downlink allocation control information is not detected in other than the preferential downlink unit band (that is, NACK/DTX), control section 409 transmit a response signal using a third constellation point (e.g., (I,Q)=(1,0) or the like) of PUCCH resource 1.

On the contrary, when downlink allocation control information is not detected in the preferential downlink unit band and the error detection result regarding downlink data transmitted in other than the preferential downlink unit band shows "no error" (that is, DTX/ACK), control section 409 sets a fourth constellation point in PUCCH resource 2 (that is, resources of PUCCH region b) and transmits a response signal. However, the fourth constellation point may also be the same constellation point as one of the first to third constellation points (e.g., (I,Q)=(−1,0) or the like). Similarly, when the error detection result regarding downlink data transmitted in the preferential downlink unit band shows "error present" and the error detection result regarding downlink data transmitted in other than the preferential downlink unit band shows "no error" (that is, NACK/ACK), control section 409 also sets a fourth constellation point in PUCCH resource 2 (that is, resources of PUCCH region b) and transmits a response signal.

Furthermore, when downlink allocation control information is not detected in the preferential downlink unit band and the error detection result regarding downlink data transmitted in other than the preferential downlink unit band shows "error present" (that is, DTX/NACK), control section 409 sets a fifth constellation point in PUCCH resource 2 (that is, resources of PUCCH region b) and transmits a response signal. However, the fifth constellation point may be the same constellation point as one of the first to third constellation points as long as it is different from the fourth constellation point (e.g. (I,Q)=(1,0) or the like).

Thus, as also shown in FIG. 12B, one or a plurality of reception situation patterns are associated with three constellation points of PUCCH resource 1 and two constellation points of PUCCH resource 2 respectively. Therefore, three constellation points of QPSK constellation points are used in PUCCH resource 1 and two constellation points of BPSK are used in PUCCH resource 2.

Here, the ratio of the time in which base station 300 must transmit downlink data to terminal 400 using carrier aggregation (that is, ratio in subframe) is generally not assumed to be large. This is because when station 300 communicate with a sufficiently large number of terminals base, such a situation is unlikely to occur that only some terminals continue to occupy a plurality of downlink unit bands.

Therefore, when viewed from terminal 400, since the frequency with which downlink data is transmitted using carrier aggregation is small, the frequency with which downlink allocation control information is detected in downlink unit bands other than the preferential downlink unit band is also small. That is, there are more chances that terminal 400 feeds back "DTX" to downlink unit bands other than the preferential downlink unit band.

Furthermore, as in the case of Embodiments 1 and 2, base station 300 generally controls the coding rate and modulation scheme of downlink data so that the assumed error rate (Target Block Error Rate: Target BLER) of downlink data becomes on the order of 0% to 30%. Therefore, when downlink allocation control information corresponding to downlink data on the terminal 300 side is detected, the high possibility that the response signal for the downlink data may be "ACK" is higher. Furthermore, as also shown in Embodiment 2, the base station controls the coding rate and modulation scheme of downlink allocation control information so that the assumed error rate of downlink allocation control information becomes on the order of 0% to 1%. Therefore, when base station 300 actually transmits downlink allocation control information, the probability that terminal 400 may fail to receive downlink allocation control information is very low.

From above, the probability of states that can be taken by a response signal for the preferential downlink unit band in a situation in which the terminal side should transmit a response signal (that is, a situation in which one or more pieces of downlink allocation control information are detected on the terminal side) has a relationship in magnitude expressed by equation 1 below, while the probability of states that can be taken by a response signal for downlink unit bands other than the preferential downlink unit band has a relationship in magnitude expressed by equation 2 below.

Probability of ACK>probability of NACK>probability of DTX     (Equation 1)

Probability of DTX>probability of ACK>probability of NACK     (Equation 2)

Therefore, of eight states of a response signal recognized on the terminal 400 side except DTX/DTX (that is, A/A, A/N, A/D, N/N, N/D, D/A, N/A, D/N), the state having the highest probability of occurrence is A/D (that is, a state in which, of the plurality of downlink unit bands 1 and 2, no error is detected in downlink data transmitted in the preferential downlink unit band (downlink unit band 1) and downlink allocation control information corresponding to downlink data in a downlink unit band (downlink unit band 2) other than the preferential downlink unit band is not detected (that is, downlink data is not transmitted in downlink unit band 2). Conversely, the state having the lowest probability of occurrence is D/N (that is, a state in which downlink allocation control information corresponding to downlink data is not detected in the preferential downlink unit band (downlink unit band 1) and downlink allocation control information in a downlink unit band (downlink unit band 2) other than the preferential downlink unit band is detected but an error is detected in the corresponding downlink data (pattern candidate)). This is because base station 300 transmits downlink data via downlink unit band 2 only when performing communication using carrier aggregation, and therefore the states of "D/A" and "D/N" in other words indicate that although base station 300 transmits downlink data in downlink unit bands 1 and 2 (and corresponding downlink allocation control information), the terminal 300 side fails to receive downlink allocation control information corresponding to downlink unit band 1.

Therefore, when downlink allocation control information corresponding to downlink data is detected in the preferential downlink unit band, no errors are detected in the downlink data and downlink allocation control information corresponding to the downlink data is not detected in any downlink unit band other than the preferential downlink unit band, a bundled response signal (that is, resources used through operation of channel selection and response signal whose constellation point is determined) is transmitted using PUCCH resource 1 in PUCCH region a associated with the downlink control channel of the preferential downlink unit band. Furthermore, when downlink allocation control information corresponding to the downlink data is not detected in the preferential downlink unit band, downlink allocation control information corresponding to the downlink data is detected in unit bands other than the preferential downlink unit band and an error is detected in the downlink data, a bundled response signal is transmitted using PUCCH resource 2 in PUCCH region b. This makes it possible to suppress the frequency with which PUCCH region b is used to a low level. Even if the multiplexing level in unit time/frequency resources included in PUCCH region b is increased to minimize increases in overhead due to PUCCH region b, since the frequency with which the bundled response signal is mapped to PUCCH region b is suppressed to a low level, inter-code interference is also prevented from increasing. It is thereby possible to prevent deterioration of transmission characteristics of a response signal and minimize increases in overhead of the uplink control channel.

That is, even when a maximum allowable number of codes multiplexed is increased to drastically reduce the number of time/frequency resources occupied by an additionally required PUCCH region (that is, PUCCH region b) resulting from carrier aggregation for resources of PUCCH region a secured in association with the control channel (that is, CCE resources) of the preferential downlink unit band, it is possible to reduce the influence of inter-code interference resulting from an increase of the maximum allowable number of codes multiplexed by reducing the probability that PUCCH resource 2 may be used. As described above, a reduction of the probability that PUCCH resource 2 may be used is realized through control of channel selection using PUCCH resource 1 in the case of ACK/DTX and using PUCCH resource 2 in the case of DTX/NACK.

The above-described effects can further be increased by mapping a state of a relatively high probability of occurrence such as ACK/ACK or NACK/DTX to PUCCH resource 1 and mapping a state of a relatively low probability of occurrence such as NACK/ACK or DTX/ACK to PUCCH resource 2. In other words, it is possible to maximize the effects of the present embodiment by mapping "ACK/*" to PUCCH resource 1 (PUCCH region b associated with the preferential downlink unit band), also "*/DTX" to PUCCH resource 1 and "DTX/*" to PUCCH resource 2 (PUCCH region b associated with a downlink unit band other than a preferential downlink unit band).

Moreover, although QPSK symbol points are used for PUCCH resource 1, BPSK symbol points are used for PUCCH resource 2. Thus, even when inter-code interference in PUCCH region b slightly increases, the channel selection state decision accuracy when using PUCCH resource 2 is less likely to deteriorate. Therefore, even if the maximum allowable number of codes multiplexed is increased to reduce overhead of PUCCH region b, an adverse influence on the system is even smaller.

As described so far, according to the present embodiment, when no error is detected in downlink data transmitted in a preferential downlink unit band and downlink allocation control information is not detected in downlink unit bands other than the preferential downlink unit band, control section 409 in terminal 400 transmits a bundled response signal using PUCCH resource 1 in PUCCH region a associated with a downlink control channel of the preferential downlink unit band (that is, response signal whose resources used and constellation point are determined by operation of channel selection) and transmits a bundled response signal using PUCCH resource 2 in PUCCH region b when downlink allocation control information is not detected in the preferential downlink unit band, downlink allocation control information is detected in unit bands other than the preferential downlink unit band and an error is detected in the transmitted downlink data.

By so doing, the frequency with which a bundled response signal is mapped to PUCCH region b can be made smaller than that of PUCCH region a. Since the frequency with which a bundled response signal is mapped to PUCCH region b is reduced, it is possible to increase the multiplexing level of PUCCH region b and suppress increases in overhead due to PUCCH region b to a minimum while preventing inter-code interference from increasing.

A case has been described above where information regarding PUCCH resource 2 is shared beforehand between base station 300 and terminal 400. That is, it is assumed that information regarding PUCCH resource 2 is explicitly reported from base station 300 to terminal 400. However, the present invention is not limited to this, but PUCCH resource 2 as well as PUCCH resource 1 can be defined in association with CCEs occupied by downlink allocation control information transmitted in other than the preferential downlink unit band. That is, implicit signaling for PUCCH resource 2 may be applicable. This makes it possible to reduce signaling overhead regarding PUCCH resource 2.

Furthermore, when PUCCH resource 2 is associated with CCEs occupied by downlink allocation control information transmitted in other than the preferential downlink unit band, a plurality of CCEs (e.g., m continuous CCEs) in a downlink unit band other than the preferential downlink unit band may be associated with one PUCCH resource 2 in PUCCH region b to reduce the number of resources secured in PUCCH region b. This causes the total number of PUCCH resources 2 to be defined in PUCCH region b of the uplink control channel to be reduced to the number of CCEs/m, which further reduces PUCCH overhead.

The above descriptions presuppose that PUCCH region a including PUCCH resource 1 does not overlap with PUCCH region b including PUCCH resource 2. However, the present invention is not limited to this, PUCCH region a and PUCCH region b may partially or totally overlap with each other. In short, it is only required that the base station side perform control such that PUCCH resource 1 and PUCCH resource 2 to be recognized by a certain terminal in a certain subframe are different from each other. Base station 300 provides overlapping PUCCH region a and PUCCH region b, and can thereby reduce PUCCH overhead in the system to a level equivalent to that of an LTE system.

Furthermore, a case has been described above where a ZAC sequence is used for primary-spreading and an orthogonal code sequence is used for secondary-spreading. However, the present invention may also use non-ZAC sequences which are mutually separable by different cyclic shift indices for primary-spreading. For example, GCL (Generalized Chirp like) sequence, CAZAC (Constant Amplitude Zero Auto Correlation) sequence, ZC (Zadoff-Chu) sequence, M sequence, PN sequence such as orthogonal gold code sequence or a sequence randomly generated by a computer and having an abrupt auto-correlation characteristic on the time axis or the like may be used for primary-spreading. Furthermore, the ZAC sequence may also be expressed as a combination of a "base sequence" and a cyclic shift index in the sense that it is a sequence that becomes the basis for applying cyclic shift processing. Furthermore, sequences orthogonal to each other or any sequences may be used as orthogonal code sequences for secondary-spreading as long as they are regarded as sequences substantially orthogonal to each other. For example, Walsh sequence or Fourier sequence or the like may be used for secondary-spreading as an orthogonal code sequence. In the above descriptions, resources (e.g., PUCCH resources) of response signals are defined by a cyclic shift index of a ZAC sequence and an orthogonal cover index of an orthogonal code sequence.

Furthermore, the above descriptions are given assuming that base station 300 always uses a preferential downlink unit band when performing communication without using carrier aggregation, but the present embodiment is not limited to this. That is, when base station 300 performs communication without using carrier aggregation, if the frequency with which a preferential downlink unit band is used is sufficiently greater than the frequency with which a downlink unit band other than the preferential downlink unit band is used when performing communication without using carrier aggregation, above equations 1 and 2 hold true and the effects described above in the present embodiment can be obtained.

Here, features common to Embodiments 1 to 3 above will be summarized. In Embodiments 1 to 3, the terminal transmits a bundled response signal according to the following response signal transmission rule. According to this response signal transmission rule, success/failure in reception of a plurality of downlink allocation control signals in the terminal, reception situation pattern candidates defined by error detection results regarding a plurality of pieces of downlink data and pairs of PUCCCH resources and constellation points are associated with each other. To be more specific, the reception situation pattern having the highest probability of occurrence is associated with resources of a first PUCCH region, while the reception situation pattern having the lowest probability of occurrence is associated with resources of a second PUCCH region which is at least partially different from the first PUCCH region. The resources in the first PUCCH region are resources associated with a downlink control channel of a base unit band in Embodiments 1 and 2 and resources associated with a downlink control channel of a preferential downlink unit band in Embodiment 3.

By so doing, the frequency with which a bundled response signal is mapped to the second PUCCH region can be made smaller than that of the first PUCCH region. Since the frequency with which a bundled response signal is mapped to the second PUCCH region can be suppressed to a low level, it is possible to increase the multiplexing level of the second PUCCH region and minimize increases in overhead due to the second PUCCH region while preventing inter-code interference from increasing.

Other Embodiments (1) Taking notice in Embodiments 1 to 3 that there is a high possibility that the terminal side may fail to receive downlink allocation control information and downlink data, and further taking notice in Embodiment 3 that the frequency with which the base station performs communication with the terminal using carrier aggregation is small, the probability of use of resources of PUCCH region 1 (or a) is set to be as high as possible and the frequency with which resources of PUCCH region 2 (orb) are used is set to be as low as possible. However, similar effects can also be obtained through mapping that suppresses the difference between the probability of use of resources of PUCCH region 1 (or a) and the probability of use of resources of PUCCH region 2 (orb) to the order of several times.

Figure 13:
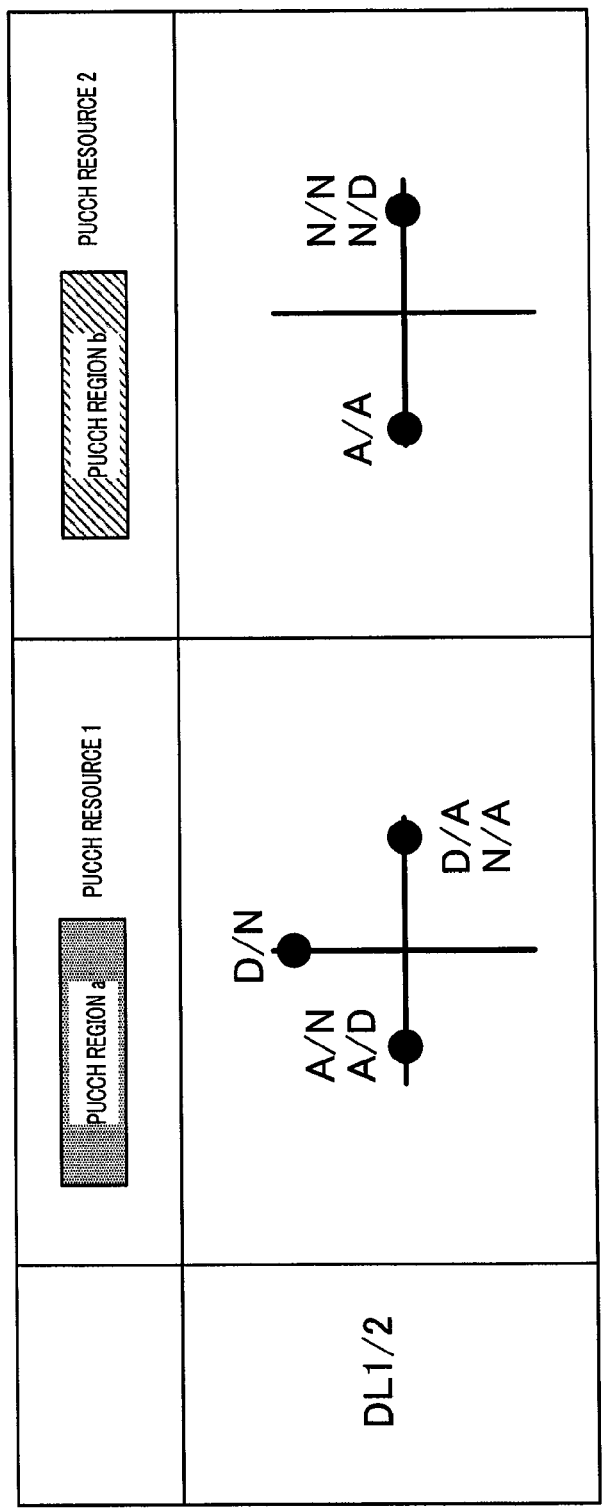
FIG. 13 is a diagram illustrating operations of a base station and terminal according to another embodiment of the present invention.

This will be described by taking Embodiment 3 as an example. When a probability that a response signal for a preferential downlink unit band may be ACK, NACK, DTX is assumed to be 89%, 10%, 1% respectively and a probability that a response signal for a downlink unit band other than the preferential downlink unit band may be DTX, ACK, NACK is assumed to be 90%, 9%, 1% respectively, the probability of use of resources of PUCCH region b in FIG. 12B is on the order of 1%. That is, there is too large a difference between the probability of use of resources of PUCCH region b and the probability of use of resources of PUCCH region a. Therefore, as shown in FIG. 13, it is also useful to adopt mapping that suppresses the difference in frequency of use between the resources of PUCCH region a and the resources of PUCCH region b to within several times by shifting the reception situation pattern with a relatively high frequency such as ACK/ACK and NACK/DTX to the resources of PUCCH region b. That is, while considering various factors under a condition that ACK/DTX having the highest probability of occurrence of the reception situation pattern is mapped to resources of PUCCH region a, such application is possible that other reception situation patterns are mapped to one of a plurality of PUCCH regions so as to optimize the balance in difference in frequency of use of the PUCCH region. The usefulness of optimizing balance in frequency of use between PUCCH regions also applies to Embodiments 1 and 2.

(2) A case has been described in Embodiments 1 and 2 where a maximum allowable number of codes multiplexed in unit time/frequency resources is independently determined for a basic region including basic PUCCH resources and an additional region including additional PUCCH resources and the maximum allowable number of codes multiplexed of the basic region is smaller than that of the additional region. That is, more boxes for accommodating PUCCH signals (that is, PUCCH resources) are provided in unit time/frequency resources of the additional region than in unit time/frequency resources of the basic region.

However, the present invention is not limited to this, but it is only necessary that the maximum allowable number of codes multiplexed of the basic region be substantially smaller than that of the additional region.

For example, even if the same number of positions used out of positions used as cyclic shift indices is set for the basic region and the additional region, if all of the following conditions (a) to (c) are satisfied, the assumed maximum number of codes multiplexed in the basic region is substantially smaller than the maximum number of codes multiplexed in the additional region.

(a) PUCCH resources in the basic region are associated with CCEs of the base unit band in a one-to-one correspondence and PUCCH resources to be used are determined from the CCE number occupied by "downlink allocation control information received by the terminal." That is, PUCCH resources are implicitly reported.

(b) Regarding PUCCH resources in the additional region, resource numbers to be used are explicitly reported from the base station to the terminal.

(c) One L1/L2 CCH may occupy a plurality of CCEs and one L1/L2 CCH reports allocation information of one piece of downlink data.

By satisfying all conditions (a) to (c), the assumed maximum number of codes multiplexed in the basic region is substantially smaller than the maximum number of codes multiplexed of the additional region for the following reasons. That is, in the additional region, the base station can allocate all PUCCH resources to different terminals, whereas in the basic region, although one L1/L2 CCH occupies a plurality of CCEs, since one L1/L2 CCH is used to report only one piece of downlink data, some CCEs remain unused. This situation becomes more noticeable when CCEs are used not only to transmit downlink allocation control information but also to transmit uplink allocation control information for reporting uplink resources to be used for uplink data from the terminal. The PUCCH region associated with the downlink control channel of the preferential downlink unit band and the PUCCH region associated with the downlink control channel of the downlink unit band other than the preferential downlink unit band in Embodiment 3 can also be treated the same as the above-described basic region and additional region.

(3) A case has been described in the above-described embodiments where two downlink unit bands are included in a unit band group in asymmetric carrier aggregation configured for the terminal. However, the present invention is not limited to this and three or more downlink unit bands may be included in the unit band group. In this case, PUCCH regions corresponding to the respective downlink unit bands are defined separately.

(4) A case has been described in the above-described embodiments where only one uplink unit band is included in a unit band group in asymmetric carrier aggregation configured for the terminal, and the basic PUCCH resources and the additional PUCCH resources are included in the same uplink unit band. However, the present invention is not limited to this, but a plurality of uplink unit bands may be included in the unit band group and the basic PUCCH resources and the additional PUCCH resources may be defined in different uplink unit bands.

(5) Only asymmetric carrier aggregation has been described in the above-described embodiments. However, the present invention is not limited to this, but the present invention is also applicable to a case where symmetric carrier aggregation is set with respect to data transmission. In short, the present invention is applicable to any case where a plurality of PUCCH regions are defined in uplink unit bands included in the unit band group of the terminal and a PUCCH region including PUCCH resources to be used is determined according to the situation of success/failure in reception of downlink data.

(6) A case has been described in the above-described embodiments where the control section (101, 301) of the base station performs control such that downlink data and downlink allocation control information corresponding to the downlink data are mapped to the downlink unit band, but the present invention is not limited to this. That is, even if downlink data and downlink allocation control information corresponding to the downlink data are mapped to different downlink unit bands, the downlink data and downlink allocation control information corresponding to the downlink data need not always be mapped to the same downlink unit band as long as the correlation between the downlink allocation control information and downlink data is clear. In this case, the terminal side obtains PUCCH resources as the PUCCH resources associated with the "resources (CCE) occupied by downlink allocation control information (which is not necessarily present in the same downlink unit band as the downlink data) corresponding to downlink data transmitted in the corresponding downlink unit band."

(7) Furthermore, the ZAC sequence in the above-described embodiments may also be referred to as "base sequence" in the sense that it is a sequence that serves as the basis for applying cyclic shift processing.

Furthermore, the Walsh sequence may also be referred to as "Walsh code sequence."

(8) Furthermore, a case has been described in the above-described embodiments where secondary-spreading is performed after primary-spreading and IFFT transform as the order of processing on the terminal side. However, the order of processing is not limited to this. That is, since both primary-spreading and secondary-spreading are multiplication processing, an equivalent result may be obtained regardless of the location of secondary-spreading processing as long as IFFT processing follows primary-spreading processing.

(9) Furthermore, since the spreading section according to the above-described embodiments performs processing of multiplying a certain signal by a sequence, the spreading section may also be called a "multiplication section."

(10) Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2009-146592, filed on Jun. 19, 2009 and Japanese Patent Application No. 2009-252051, filed on Nov. 2, 2009, including the specifications, drawings and abstracts, are incorporated herein by reference in their entirety.

INDUSTRIAL APPLICABILITY

When ARQ is applied to communication using an uplink unit band and a plurality of downlink unit bands associated with the uplink unit band, the terminal apparatus and retransmission control method according to the present invention are useful as being able to prevent deterioration of transmission characteristics of a response signal and suppress increases in overhead of an uplink control channel to a minimum.

REFERENCE SIGNS LIST 100 base station
101, 209, 301, 409 control section
102, 302 control information generation section
103, 106 coding section
104, 108, 214 modulation section
105 broadcast signal generation section
107, 307 data transmission control section
109 mapping section
110, 217 IFFT section
111, 218 CP adding section
112, 219 radio transmitting section
113, 201 radio receiving section
114, 202 CP removing section
115 PUCCH extraction section
116 despreading section
117 sequence control section
118 correlation processing section
119, 208 decision section
120 retransmission control signal generation section
200 terminal
203 FFT section
204 extraction section
205 broadcast signal receiving section
206, 210 demodulation section 207, 211 decoding section
212 CRC section
213 response signal generation section
215 primary-spreading section
216 secondary-spreading section

The invention claimed is:

1. A terminal, comprising:
   circuitry, which, in operation,
      detects control information on a control channel element (CCE), the control information including downlink assignment information that indicates a downlink data resource assigned to one of a plurality of configured downlink component carriers, the plurality of configured downlink component carriers including at least a first downlink component carrier and a second downlink component carrier to which respective downlink data resources are assigned by the respective control information;
      decodes the control information; and
      decodes downlink data in the respective downlink data resources; and
   a transmitter, which, in operation, transmits respective response signals to the downlink data,
   wherein:
      a response signal is transmitted using one of a first uplink control channel resource, an index of which is associated with a CCE number of the CCE, or a second uplink control channel resource, an index of which is signaled to the terminal, depending on a combination of an Acknowledgement (ACK) representing a successful outcome of decoding the control information, a Negative Acknowledgment (NACK) representing an unsuccessful outcome of decoding the control information, and a Discontinuous Transmission (DTX) representing that an outcome of decoding the control information is not transmitted, for the control information on the first downlink component carrier and for the control information on the second downlink component carrier.

2. The terminal according to claim 1, wherein the first uplink control channel resource is used when the control information on the first downlink component carrier is detected and the control information on the second downlink component carrier is not detected, and the second uplink control channel resource is used when the control information on the first downlink component carrier is not detected and the control information on the second downlink component carrier is detected.

3. The terminal according to claim 1, wherein the response signals denote one of:
   an outcome of a decoding of the downlink data on the respective downlink component carrier(s); and
   a Discontinuous Transmission (DTX) representing that the outcome is not transmitted.

4. The terminal according to claim 3, wherein when a response signal denotes the DTX for downlink data on the second downlink component carrier, the transmitter, in operation, transmits the response signal using the first uplink control channel resource.

5. The terminal according to claim 3, wherein when a response signal denotes the DTX for downlink data on the first downlink component carrier, the transmitter, in operation, transmits the response signal using the second uplink control channel resource.

6. The terminal according to claim 3, wherein when a response signal denotes the outcome for downlink data on the first downlink component carrier and denotes an unsuccessful decoding or the DTX for downlink data on the second downlink component carrier, the transmitter, in operation, transmits the response signal using the first uplink control channel resource.

7. The terminal according to claim 3, wherein when a response signal denotes the outcome for downlink data on the second downlink component carrier and denotes the DTX for downlink data on the first downlink component carrier, the transmitter, in operation, transmits the response signal using the second uplink control channel resource.

8. The terminal according to claim 3, wherein when a response signal denotes a successful decoding for downlink data on the second downlink component carrier and denotes an unsuccessful decoding or the DTX for downlink data on the first downlink component carrier, the transmitter, in operation, transmits the response signal using the second uplink control channel resource.

9. The terminal according to claim 1, wherein the first downlink component carrier is a primary component carrier.

10. The terminal according to claim 1, wherein the transmitter, in operation, transmits the response signal on a single uplink component carrier.

11. The terminal according to claim 1, wherein the response signals denote an outcome of a decoding in the terminal by one of an Acknowledgment (ACK) and a Negative Acknowledgment (NACK).

12. The terminal according to claim 1, wherein at least one response signal denotes a Discontinuous Transmission (DTX) that represents that downlink assignment information corresponding to the downlink data is not detected by the circuitry.

13. The terminal according to claim 1, wherein the first uplink control channel resource index is implicitly signaled to the terminal, and the second uplink control channel resource index is explicitly signaled to the terminal.

14. A terminal, comprising:
    circuitry, which, in operation,
       detects control information on a control channel element (CCE), the control information including downlink assignment information that indicates a downlink data resource assigned to one of a plurality of configured downlink component carriers, the plurality of configured downlink component carriers including at least a first downlink component carrier and a second downlink component carrier to which respective downlink data resources are assigned by the respective control information;
       decodes the control information; and
       decodes downlink data in the respective downlink data resources; and
    a transmitter, which, in operation, transmits respective response signals to the downlink data,
    wherein:
       a response signal is transmitted using one of a first uplink control channel resource, an index of which is associated with a CCE number of the CCE, or a second uplink control channel resource, an index of which is signaled to the terminal, depending on a combination of an Acknowledgement (ACK) representing a successful outcome of decoding the control information, a Negative Acknowledgment (NACK) representing an unsuccessful outcome of decoding the control information, and a Discontinuous Transmission (DTX) representing that an outcome of decoding the control information is not transmitted, for the control information corresponding to downlink data on the first downlink component carrier and for the control information corresponding to downlink data on the second downlink component carrier.

15. The terminal according to claim 14, wherein the first uplink control channel resource is used when the control information corresponding to downlink data on the first downlink component carrier is detected and the control information corresponding to downlink data on the second downlink component carrier is not detected, and the second uplink control channel resource is used when the control information corresponding to downlink data on the first downlink component carrier is not detected and the control information corresponding to downlink data on the second downlink component carrier is detected.

16. A method, comprising:
    detecting, by a terminal, control information on a control channel element (CCE), the control information including downlink assignment information that indicates a downlink data resource assigned to one of a plurality of configured downlink component carriers, the plurality of configured downlink component carriers including at least a first downlink component carrier and a second downlink component carrier to which respective downlink data resources are assigned by the respective control information;
    decoding the control information;
    decoding downlink data in the respective downlink data resources; and
    transmitting respective response signals to the downlink data,
    wherein:
        a response signal is transmitted using one of a first uplink control channel resource, an index of which is associated with a CCE number of the CCE, or a second uplink control channel resource, an index of which is signaled to the terminal, depending on a combination of an Acknowledgement (ACK) representing a successful outcome of decoding the control information, a Negative Acknowledgment (NACK) representing an unsuccessful outcome of decoding the control information, and a Discontinuous Transmission (DTX) representing that an outcome of decoding the control information is not transmitted, for the control information on the first downlink component carrier and for the control information on the second downlink component carrier.

17. The method according to claim 16, wherein the first uplink control channel resource is used when the control information on the first downlink component carrier is detected and the control information on the second downlink component carrier is not detected, and the second uplink control channel resource is used when the control information on the first downlink component carrier is not detected and the control information on the second downlink component carrier is detected.

18. A method, comprising:
    detecting, by a terminal, control information on a control channel element (CCE), the control information including downlink assignment information that indicates a downlink data resource assigned to one of a plurality of configured downlink component carriers, the plurality of configured downlink component carriers including at least a first downlink component carrier and a second downlink component carrier to which respective downlink data resources are assigned by the respective control information;
    decoding the control information;
    decoding downlink data in the respective downlink data resources; and
    transmitting respective response signals to the downlink data,
    wherein:
        a response signal is transmitted using one of a first uplink control channel resource, an index of which is associated with a CCE number of the CCE, or a second uplink control channel resource, an index of which is signaled to the terminal, depending on a combination of an Acknowledgement (ACK) representing a successful outcome of decoding the control information, a Negative Acknowledgment (NACK) representing an unsuccessful outcome of decoding the control information, and a Discontinuous Transmission (DTX) representing that an outcome of decoding the control information is not transmitted, for the control information corresponding to downlink data on the first downlink component carrier and for the control information corresponding to downlink data on the second downlink component carrier.

19. The method according to claim 18, wherein the first uplink control channel resource is used when the control information corresponding to downlink data on the first downlink component carrier is detected and the control information corresponding to downlink data on the second downlink component carrier is not detected, and the second uplink control channel resource is used when the control information corresponding to downlink data on the first downlink component carrier is not detected and the control information corresponding to downlink data on the second downlink component carrier is detected.

* * * * *